(12) United States Patent
Lin et al.

(10) Patent No.: US 11,125,976 B2
(45) Date of Patent: Sep. 21, 2021

(54) OPTICAL IMAGING SYSTEM COMPRISING FOUR LENSES OF --+-, +-+-, +++- OR -++- REFRACTIVE POWERS, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 156 days.

(21) Appl. No.: 16/512,097

(22) Filed: Jul. 15, 2019

(65) Prior Publication Data
US 2020/0301107 A1   Sep. 24, 2020

(30) Foreign Application Priority Data

Mar. 22, 2019   (TW) .................................. 108109991

(51) Int. Cl.
*G02B 13/00*   (2006.01)
*G02B 9/34*   (2006.01)
*G02B 13/18*   (2006.01)

(52) U.S. Cl.
CPC ............. *G02B 13/004* (2013.01); *G02B 9/34* (2013.01); *G02B 13/18* (2013.01)

(58) Field of Classification Search
CPC ......... G02B 13/004; G02B 9/34; G02B 13/18
See application file for complete search history.

(56) References Cited

U.S. PATENT DOCUMENTS

| 2013/0057969 A1 | 3/2013 | Lai et al. |
| 2013/0278714 A1 | 10/2013 | Hirose |
| 2014/0133015 A1 | 5/2014 | Hsueh et al. |

(Continued)

FOREIGN PATENT DOCUMENTS

| CN | 107092077 A | 8/2017 |
| CN | 207336900 U | 5/2018 |

(Continued)

OTHER PUBLICATIONS

TW Office Action in application No. 108109991 dated Aug. 22, 2019.

*Primary Examiner* — Wen Huang
(74) *Attorney, Agent, or Firm* — Maschoff Brennan

(57) ABSTRACT

An optical imaging system includes four lens elements which are, in order from an object side to an image side: a first lens element, a second lens element, a third lens element and a fourth lens element. Each of the four lens elements of the optical imaging system has an object-side surface facing toward the object side and an image-side surface facing toward the image side. The object-side surface of the first lens element is concave in a paraxial region thereof, and the image-side surface of the first lens element is convex in a paraxial region thereof. The object-side surface of the fourth lens element is convex in a paraxial region thereof, the image-side surface of the fourth lens element is concave in a paraxial region thereof, and the image-side surface of the fourth lens element has at least one convex shape in an off-axis region thereof.

15 Claims, 21 Drawing Sheets

(56) References Cited

U.S. PATENT DOCUMENTS

| | | | |
|---|---|---|---|
| 2015/0085382 A1 | 3/2015 | Choi et al. | |
| 2016/0116704 A1 | 4/2016 | Chen et al. | |
| 2016/0116711 A1 | 4/2016 | Lee et al. | |
| 2016/0161706 A1 | 6/2016 | Liao et al. | |
| 2019/0107689 A1 | 4/2019 | Huang | |
| 2019/0250369 A1 | 8/2019 | Chang et al. | |
| 2019/0250370 A1 | 8/2019 | Chang et al. | |
| 2021/0026107 A1* | 1/2021 | He | G02B 9/34 |

FOREIGN PATENT DOCUMENTS

| | | |
|---|---|---|
| CN | 110031950 A | 7/2019 |
| JP | 1995104184 A | 4/1995 |
| JP | 1996262322 A | 10/1996 |
| JP | H11133297 A | 5/1999 |
| JP | 2002221657 A | 8/2002 |
| JP | 2003098428 A | 4/2003 |
| JP | 2003098429 A | 4/2003 |
| JP | 2003177316 A | 6/2003 |
| JP | 2004246166 A | 9/2004 |
| JP | 2004246167 A | 9/2004 |
| JP | 2009297401 A | 12/2009 |
| NO | 2012090729 A | 5/2012 |

\* cited by examiner

OPTICAL IMAGING SYSTEM COMPRISING FOUR LENSES OF --+-, +-+-, +++- OR -++- REFRACTIVE POWERS, IMAGE CAPTURING UNIT AND ELECTRONIC DEVICE

RELATED APPLICATIONS

This application claims priority to Taiwan Application 108109991, filed on Mar. 22, 2019, which is incorporated by reference herein in its entirety.

BACKGROUND

Technical Field

The present disclosure relates to an optical imaging system, an image capturing unit and an electronic device, more particularly to an optical imaging system and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The object-side surface of the first lens element is concave in a paraxial region thereof, and the image-side surface of the first lens element is convex in a paraxial region thereof. The object-side surface of the fourth lens element is convex in a paraxial region thereof, the image-side surface of the fourth lens element is concave in a paraxial region thereof, and the image-side surface of the fourth lens element has at least one convex shape in an off-axis region thereof.

When a focal length of the optical imaging system is f, a focal length of the first lens element is f1, a focal length of the second lens element is f2, an entrance pupil diameter of the optical imaging system is EPD, a central thickness of the first lens element is CT1, a central thickness of the second lens element is CT2, a central thickness of the third lens element is CT3, and a central thickness of the fourth lens element is CT4, the following conditions are satisfied:

$0 \leq |f/f1| + |f/f2| < 1.0$;

$1.0 < f/EPD < 2.70$;

$CT1 < CT3$;

$CT2 < CT3$; and $CT4 < CT3$.

According to another aspect of the present disclosure, an image capturing unit includes the aforementioned optical imaging system and an image sensor, wherein the image sensor is disposed on an image surface of the optical imaging system.

According to another aspect of the present disclosure, an electronic device includes the aforementioned image capturing unit.

According to another aspect of the present disclosure, an optical imaging system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The object-side surface of the first lens element is concave in a paraxial region thereof, and the image-side surface of the first lens element is convex in a paraxial region thereof. The object-side surface of the fourth lens element is convex in a paraxial region thereof, the image-side surface of the fourth lens element is concave in a paraxial region thereof, and the image-side surface of the fourth lens element has at least one convex shape in an off-axis region thereof.

When a focal length of the optical imaging system is f, a focal length of the first lens element is f1, a focal length of the second lens element is f2, an entrance pupil diameter of the optical imaging system is EPD, an axial distance between the first lens element and the second lens element is T12, a central thickness of the first lens element is CT1, a central thickness of the second lens element is CT2, a central thickness of the third lens element is CT3, and a central thickness of the fourth lens element is CT4, the following conditions are satisfied:

$0 \leq |f/f1| + |f/f2| < 1.0$;

$1.0 < EPD/T12 < 8.0$; and $0.20 < (CT1+CT2+CT4)/CT3 < 2.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
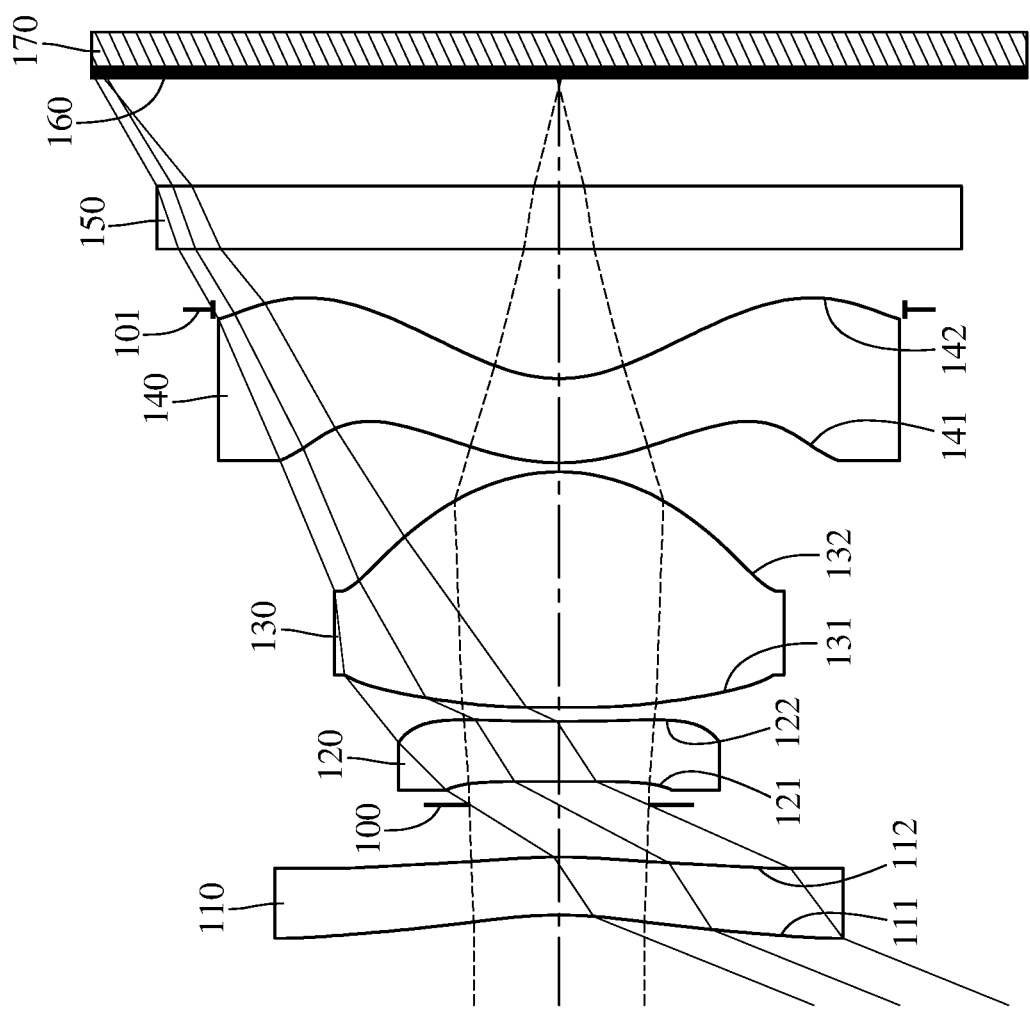
FIG. 1 is a schematic view of an image capturing unit according to the 1st embodiment of the present disclosure.

An optical imaging system includes four lens elements. The four lens elements are, in order from an object side to an image side, a first lens element, a second lens element, a third lens element and a fourth lens element. Each of the four lens elements of the optical imaging system has an object-side surface facing toward the object side and an image-side surface facing toward the image side.

The object-side surface of the first lens element is concave in a paraxial region thereof, and the image-side surface of the first lens element is convex in a paraxial region thereof. Therefore, it is favorable for controlling the size of the first lens element so as to obtain a wide field of view and a compact configuration. The object-side surface of the first lens element can have at least one convex shape in an off-axis region thereof. Therefore, it is favorable for controlling the space occupied by the first lens element so as to prevent the size of the optical imaging system from being overly large.

The object-side surface of the second lens element can be concave in a paraxial region thereof, and the image-side surface of the second lens element can be convex in a paraxial region thereof. Therefore, it is favorable for preventing the incident angles of light rays on the second lens element from being too large so as to avoid total reflection, such that the optical imaging system is able to receive light rays from a large view angle.

The third lens element can have positive refractive power. Therefore, it is favorable for providing significant light converging capability so as to control the size of the optical imaging system. The image-side surface of the third lens element can be convex in a paraxial region thereof. Therefore, it is favorable for balancing the shape of the image-side surface of the third lens element so as to obtain a compact configuration, thereby making the optical imaging system applicable to various applications.

The fourth lens element can have negative refractive power. Therefore, it is favorable for increasing color saturation and effectively correcting chromatic aberration of the optical imaging system so as to improve image quality. The object-side surface of the fourth lens element is convex in a paraxial region thereof, and the image-side surface of the fourth lens element is concave in a paraxial region thereof. Therefore, it is favorable for reducing the back focal length of the optical imaging system so as to obtain a compact configuration. The image-side surface of the fourth lens element has at least one convex shape in an off-axis region thereof. Therefore, it is favorable for effectively correcting off-axis aberrations and reducing the size of the optical imaging system.

When a focal length of the optical imaging system is f, a focal length of the first lens element is f1, and a focal length of the second lens element is f2, the following condition is satisfied: $0 \leq |f/f1|+|f/f2|<1.0$. Therefore, it is favorable for balancing the refractive power distribution between the first and second lens elements so as to enhance the capability of correcting aberrations on the object side of the optical imaging system. Moreover, the following condition can also be satisfied: $0 \leq |f/f1|+|f/f2|<0.50$.

When the focal length of the optical imaging system is f, and an entrance pupil diameter of the optical imaging system is EPD, the following condition can be satisfied: $1.0<f/EPD<2.70$. Therefore, it is favorable for adjusting the entrance pupil diameter so as to ensure sufficient incident light and thereby increase image brightness. Moreover, the following condition can also be satisfied: $1.0<f/EPD<2.50$. Moreover, the following condition can also be satisfied: $1.0<f/EPD<2.30$.

When a central thickness of the first lens element is CT1, a central thickness of the second lens element is CT2, a central thickness of the third lens element is CT3, and a central thickness of the fourth lens element is CT4, the following conditions can be satisfied: $CT1<CT3$; $CT2<CT3$; and $CT4<CT3$. Therefore, it is favorable for balancing the thicknesses of the lens elements so as to properly arrange refractive power of the optical imaging system.

When the entrance pupil diameter of the optical imaging system is EPD, and an axial distance between the first lens element and the second lens element is T12, the following condition can be satisfied: $1.0<EPD/T12<8.0$. Therefore, it is favorable for enlarging the entrance pupil diameter of the optical imaging system so as to increase image brightness.

When the central thickness of the first lens element is CT1, the central thickness of the second lens element is CT2, the central thickness of the third lens element is CT3, and the central thickness of the fourth lens element is CT4, the following condition can be satisfied: $0.20<(CT1+CT2+CT4)/CT3<2.0$. Therefore, it is favorable for balancing the thickness distribution of the lens elements so as to prevent excessive thickness differences among the lens elements and thereby prevent poor space utilization in the optical imaging system; furthermore, it is also favorable for controlling the power of the third lens element.

According to the present disclosure, the optical imaging system further includes an aperture stop, and the aperture stop can be disposed between the first lens element and the second lens element. When an axial distance between the aperture stop and the image-side surface of the fourth lens element is SD, and an axial distance between the object-side surface of the first lens element and the image-side surface of the fourth lens element is TD, the following condition can be satisfied: 0.45<SD/TD<0.95. Therefore, it is favorable for controlling the position of the aperture stop and balancing between the field of view and total track length of the optical imaging system so as to obtain a wide field of view and a compact configuration.

When the central thickness of the second lens element is CT2, and the central thickness of the third lens element is CT3, the following condition can be satisfied: 0.20<CT2/CT3<0.60. Therefore, it is favorable for adjusting the thickness ratio of the second lens element to the third lens element so as to balance the space arrangement of the optical imaging system, thereby improving the assembling yield rate and product quality. Moreover, the following condition can also be satisfied: 0.20<CT2/CT3<0.57.

When the central thickness of the third lens element is CT3, a curvature radius of the object-side surface of the first lens element is R1, and a curvature radius of the image-side surface of the first lens element is R2, the following condition can be satisfied: −2.50<(CT3/R1)+(CT3/R2)<−0.55. Therefore, it is favorable for balancing the shape of the first lens element so as to correct coma and astigmatism, and ensuring that the third lens element has sufficient thickness and structural strength.

When an axial distance between the object-side surface of the first lens element and an image surface is TL, the following condition can be satisfied: 1.0 [mm]<TL<3.30 [mm]. Therefore, it is favorable for controlling the total track length of the optical imaging system so as to obtain a compact configuration.

When the central thickness of the first lens element is CT1, the central thickness of the third lens element is CT3, the central thickness of the fourth lens element is CT4, and an axial distance between the second lens element and the third lens element is T23, the following condition can be satisfied: 0.20<(CT1+CT4+T23)/CT3<1.10. Therefore, it is favorable for balancing the central thicknesses of the lens elements with the aforementioned axial distances so as to optimize image quality. Moreover, the following condition can also be satisfied: 0.20<(CT1+CT4+T23)/CT3≤1.0.

When a maximum image height of the optical imaging system (half of a diagonal length of an effective photosensitive area of an image sensor) is ImgH, and the focal length of the optical imaging system is f, the following condition can be satisfied: 1.20<ImgH/f<3.0. Therefore, it is favorable for adjusting the optical imaging system to have better viewing angles for various applications.

When a minimum value among Abbe numbers of all lens elements of the optical imaging system is Vmin, the following condition can be satisfied: 13.0<Vmin<21.0. Therefore, it is favorable for the lens elements to better control the light path so as to increase the design flexibility for satisfying demanding product specifications.

When the axial distance between the first lens element and the second lens element is T12, the axial distance between the second lens element and the third lens element is T23, and an axial distance between the third lens element and the fourth lens element is T34, the following conditions can be satisfied: T23<T12; and T34<T12. Therefore, it is favorable for providing sufficient space on the object side of the optical imaging system so as to control light rays from a large view angle, thereby minimizing off-axis aberrations.

Figure 21:
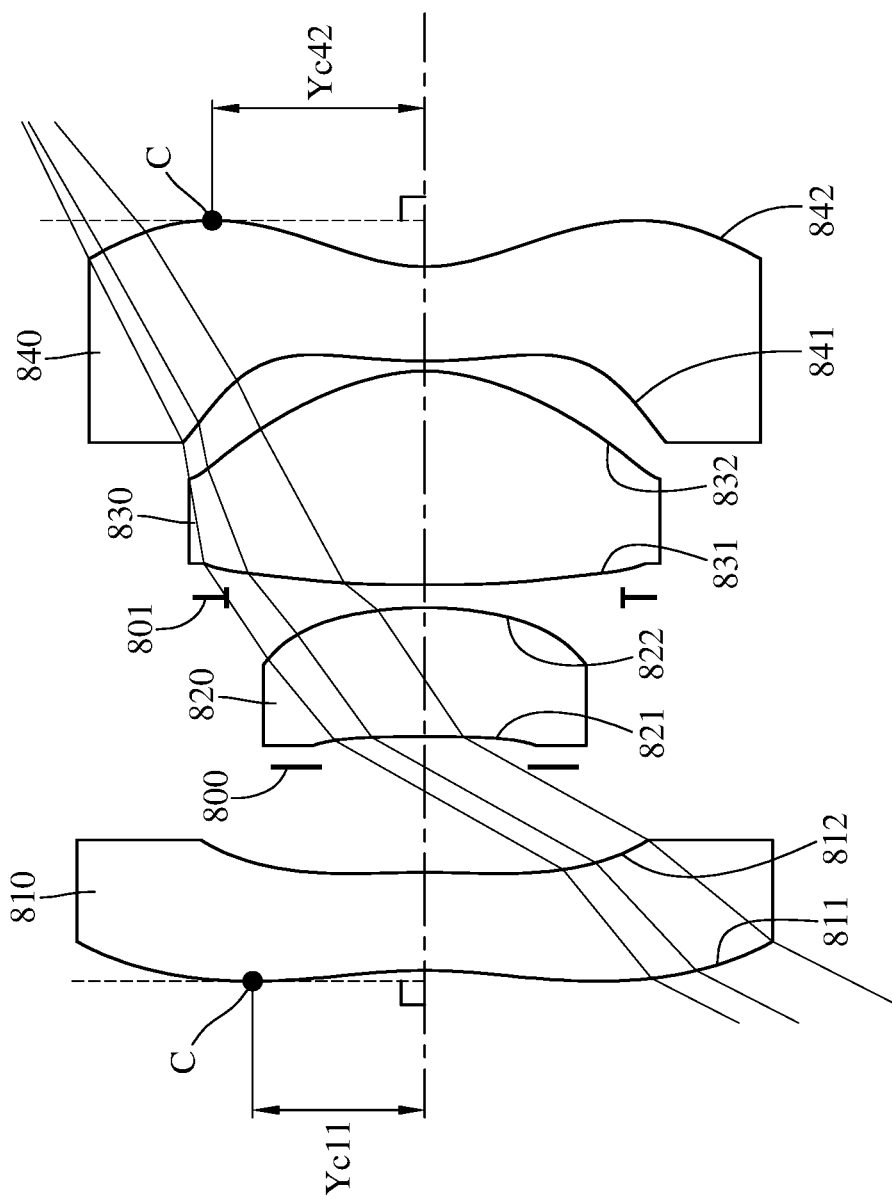
FIG. 21 shows a schematic view of Yc11, Yc42, a critical point of the object-side surface of the first lens element, and a critical point of the image-side surface of the fourth lens element according to the 8th embodiment of the present disclosure.

When a vertical distance between a critical point on the object-side surface of the first lens element and an optical axis is Yc11, and a vertical distance between a critical point on the image-side surface of the fourth lens element and the optical axis is Yc42, the following condition can be satisfied: 0.15<Yc11/Yc42<1.50. Therefore, it is favorable for enhancing the capability of correcting off-axis aberrations, and effectively reducing the total track length of the optical imaging system so as to meet the requirements of compactness and a wide field of view. Please refer to FIG. 21, which shows a schematic view of Yc11, Yc42, a critical point C of the object-side surface 811 of the first lens element 810 and a critical point C of the image-side surface 842 of the fourth lens element 840 according to the 8th embodiment of the present disclosure.

When the axial distance between the first lens element and the second lens element is T12, and the central thickness of the first lens element is CT1, the following condition can be satisfied: 0.60<T12/CT1<1.33. Therefore, it is favorable for balancing the thickness and axial distance between adjacent lens elements on the object side of the optical imaging system so as to properly control the light path on the object side and thereby reduce aberrations.

When an Abbe number of the first lens element is V1, an Abbe number of the second lens element is V2, an Abbe number of the third lens element is V3, an Abbe number of the fourth lens element is V4, an Abbe number of the i-th lens element is Vi, a refractive index of the first lens element is N1, a refractive index of the second lens element is N2, a refractive index of the third lens element is N3, a refractive index of the fourth lens element is N4, and a refractive index of the i-th lens element is Ni, at least one lens element of the optical imaging system can satisfy the following condition: Vi/Ni<13.5, wherein i=1, 2, 3, or 4. Therefore, it is favorable for light refraction of the lens elements so as to achieve higher specifications and improved image quality.

When the Abbe number of the first lens element is V1, and the Abbe number of the fourth lens element is V4, the following condition can be satisfied: 27<V1-V4<50. Therefore, it is favorable for ensuring sufficient material differences between the first lens element and the fourth lens element so as to satisfy various requirements of light path refraction on the object side and image side of the optical imaging system.

When the focal length of the optical imaging system is f, and the focal length of the first lens element is f1, the following condition can be satisfied: −1.0<f/f1<0.05. Therefore, it is favorable for providing a retro-focus configuration so as to increase the detection range of the optical imaging system.

When the focal length of the optical imaging system is f, and the focal length of the second lens element is f2, the following condition can be satisfied: −0.40<f/f2<0.65. Therefore, it is favorable for correcting spherical aberration and coma generated by the first lens element so as to configure the second lens element as a correction lens for balancing image quality of various off-axis fields.

When the focal length of the second lens element is f2, and a focal length of the third lens element is f3, the following condition can be satisfied: −0.50<f3/f2<0.90. Therefore, it is favorable for correcting aberrations of the second lens element and improving light refraction of the third lens element so as to provide a wide-field-of-view configuration.

When the axial distance between the object-side surface of the first lens element and the image surface is TL, and the focal length of the optical imaging system is f, the following condition can be satisfied: $2.10<TL/f<3.0$. Therefore, it is favorable for balancing between the total track length and the field of view of the optical imaging system so as to be applicable to various applications.

When a curvature radius of the object-side surface of the third lens element is R5, and a curvature radius of the image-side surface of the third lens element is R6, the following condition can be satisfied: $0<(R5+R6)/(R5-R6)<3.0$. Therefore, it is favorable for balancing the shape of the third lens element so as to prevent an overly large curvature of a single lens surface of the third lens element and thus prevent excessive aberrations.

When the axial distance between the object-side surface of the first lens element and the image surface is TL, and the maximum image height of the optical imaging system is ImgH, the following condition can be satisfied: $1.50<TL/ImgH<2.30$. Therefore, it is favorable for ensuring image brightness with a sufficient light-receiving area while miniaturizing the optical imaging system.

When the focal length of the optical imaging system is f, and a focal length of the fourth lens element is f4, the following condition can be satisfied: $-0.80<f/f4<0$. Therefore, it is favorable for balancing the travelling directions of light rays with different wavelengths so as to allow light rays with different wavelengths converging properly and thereby provide high fidelity images with true colors.

When the vertical distance between the critical point on the image-side surface of the fourth lens element and the optical axis is Yc42, and the focal length of the optical imaging system is f, the following condition can be satisfied: $0.40<Yc42/f<0.85$. Therefore, it is favorable for correcting field curvature and reducing the total track length so as to achieve compactness and flatten the Petzval surface of the optical imaging system.

When the curvature radius of the object-side surface of the first lens element is R1, and the curvature radius of the image-side surface of the first lens element is R2, the following condition can be satisfied: $-0.55<(R1-R2)/(R1+R2)<0.45$. Therefore, it is favorable for expanding the entrance area of incident light in the optical imaging system so as to enlarge the viewing angle, thereby capturing more image data.

According to the present disclosure, the aforementioned features and conditions can be utilized in numerous combinations so as to achieve corresponding effects.

According to the present disclosure, the lens elements of the optical imaging system can be made of either glass or plastic material. When the lens elements are made of glass material, the refractive power distribution of the optical imaging system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical imaging system can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the optical imaging system are not specifically defined, these parameters may be determined according to the operating wavelength range. For example, when the operating wavelength range is a wavelength range of visible light (e.g., 350 nm to 750 nm), these parameters are defined at the wavelength of helium d-line; when the operating wavelength range is a wavelength range of near infrared light (e.g., 750 nm to 1600 nm), these parameters are defined at the wavelength of 940 nm.

According to the present disclosure, a critical point is a non-axial point of the lens surface where its tangent is perpendicular to the optical axis.

According to the present disclosure, an image surface of the optical imaging system, based on the corresponding image sensor, can be flat or curved, especially a curved surface being concave facing towards the object side of the optical imaging system.

According to the present disclosure, an image correction unit, such as a field flattener, can be optionally disposed between the lens element closest to the image side of the optical imaging system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical imaging system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging system and thereby provides a wider field of view for the same.

According to the present disclosure, the optical imaging system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
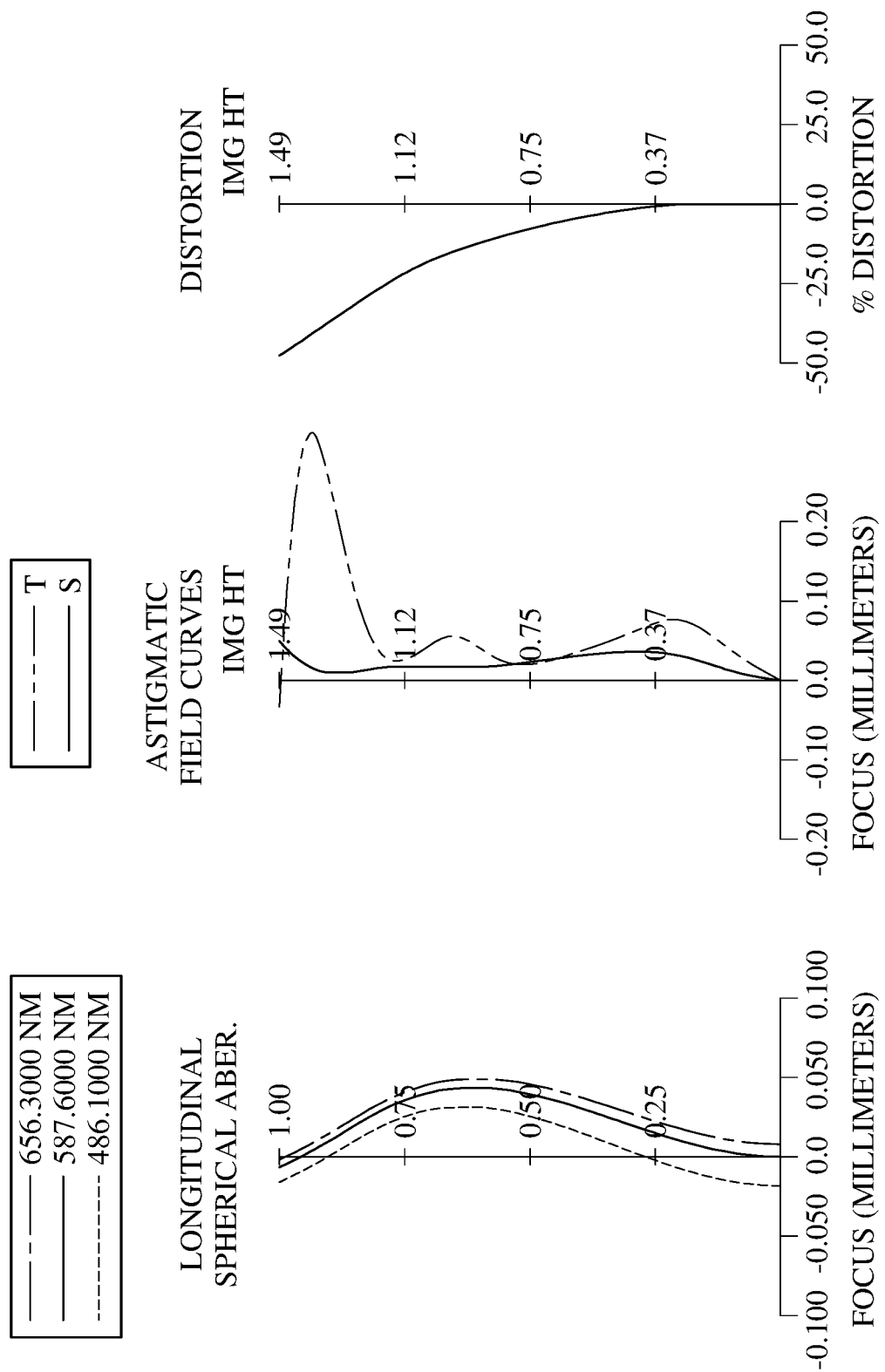
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging system (its reference numeral is omitted) of the present disclosure and an image sensor 170. The optical imaging system includes, in order from an object side to an image side, a first lens element 110, an aperture stop 100, a second lens element 120, a third lens element 130, a fourth lens element 140, a stop 101, a filter 150 and an image surface 160. The optical imaging system includes four lens elements (110, 120, 130 and 140) with no additional lens element disposed between each of the adjacent four lens elements.

The first lens element 110 with negative refractive power has an object-side surface 111 being concave in a paraxial region thereof and an image-side surface 112 being convex in a paraxial region thereof. The first lens element 110 is made of plastic material and has the object-side surface 111 and the image-side surface 112 being both aspheric. The object-side surface 111 of the first lens element 110 has at least one convex shape in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one convex shape in an off-axis region thereof. The image-side surface 142 of the fourth lens element 140 has one critical point in the off-axis region thereof.

The filter 150 is made of glass material and located between the fourth lens element 140 and the image surface 160, and will not affect the focal length of the optical imaging system. The image sensor 170 is disposed on or near the image surface 160 of the optical imaging system.

The equation of the aspheric surface profiles of the aforementioned lens elements of the 1st embodiment is expressed as follows:

$$X(Y) = (Y^2/R)/(1 + \operatorname{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging system of the image capturing unit according to the 1st embodiment, when a focal length of the optical imaging system is f, an f-number of the optical imaging system is Fno, and half of a maximum field of view of the optical imaging system is HFOV, these parameters have the following values: f=1.15 millimeters (mm), Fno=2.04, HFOV=68.0 degrees (deg.).

When a minimum value among Abbe numbers of all lens elements of the optical imaging system is Vmin, the following condition is satisfied: Vmin=20.40. In this embodiment, among the first lens element 110, the second lens element 120, the third lens element 130 and the fourth lens element 140, an Abbe number of the second lens element 120 and an Abbe number of the fourth lens element 140 are the same and are smaller than the Abbe numbers of the other lens elements, and Vmin is equal to the Abbe number of the second lens element 120 and the Abbe number of the fourth lens element 140.

When an Abbe number of the first lens element 110 is V1, and a refractive index of the first lens element 110 is N1, the following condition is satisfied: V1/N1=36.30.

When the Abbe number of the second lens element 120 is V2, and a refractive index of the second lens element 120 is N2, the following condition is satisfied: V2/N2=12.29.

When an Abbe number of the third lens element 130 is V3, and a refractive index of the third lens element 130 is N3, the following condition is satisfied: V3/N3=36.26.

When the Abbe number of the fourth lens element 140 is V4, and a refractive index of the fourth lens element 140 is N4, the following condition is satisfied: V4/N4=12.29.

When the Abbe number of the first lens element 110 is V1, and the Abbe number of the fourth lens element 140 is V4, the following condition is satisfied: V1-V4=35.68.

When an axial distance between the first lens element 110 and the second lens element 120 is T12, and a central thickness of the first lens element 110 is CT1, the following condition is satisfied: T12/CT1=1.30. In this embodiment, an axial distance between two adjacent lens elements is an air gap in a paraxial region between the two adjacent lens elements.

When an entrance pupil diameter of the optical imaging system is EPD, and the axial distance between the first lens element 110 and the second lens element 120 is T12, the following condition is satisfied: EPD/T12=2.25.

When a central thickness of the second lens element 120 is CT2, and a central thickness of the third lens element 130 is CT3, the following condition is satisfied: CT2/CT3=0.26.

When the central thickness of the first lens element 110 is CT1, the central thickness of the second lens element 120 is CT2, the central thickness of the third lens element 130 is CT3, a central thickness of the fourth lens element 140 is CT4, and an axial distance between the second lens element 120 and the third lens element 130 is T23, the following condition is satisfied: (CT1+CT4+T23)/CT3=0.66.

When the central thickness of the first lens element 110 is CT1, the central thickness of the second lens element 120 is CT2, the central thickness of the third lens element 130 is CT3, and the central thickness of the fourth lens element 140 is CT4, the following condition is satisfied: (CT1+CT2+CT4)/CT3=0.86.

When the central thickness of the third lens element 130 is CT3, a curvature radius of the object-side surface 111 of the first lens element 110 is R1, and a curvature radius of the image-side surface 112 of the first lens element 110 is R2, the following condition is satisfied: (CT3/R1)+(CT3/R2)=−1.04.

When the curvature radius of the object-side surface 111 of the first lens element 110 is R1, and the curvature radius of the image-side surface 112 of the first lens element 110 is R2, the following condition is satisfied: (R1−R2)/(R1+R2)=−0.13.

When a curvature radius of the object-side surface 131 of the third lens element 130 is R5, and a curvature radius of the image-side surface 132 of the third lens element 130 is R6, the following condition is satisfied: (R5+R6)/(R5−R6)=0.98.

When a focal length of the second lens element 120 is f2, and a focal length of the third lens element 130 is f3, the following condition is satisfied: f3/f2=−0.04.

When the focal length of the optical imaging system is f, and a focal length of the first lens element 110 is f1, the following condition is satisfied: f/f1=−0.09.

When the focal length of the optical imaging system is f, and the focal length of the second lens element 120 is f2, the following condition is satisfied: f/f2=−0.04.

When the focal length of the optical imaging system is f, and a focal length of the fourth lens element 140 is f4, the following condition is satisfied: f/f4=−0.25.

When the focal length of the optical imaging system is f, the focal length of the first lens element 110 is f1, and the focal length of the second lens element 120 is f2, the following condition is satisfied: |f/f1|+|f/f2|=0.13.

When an axial distance between the object-side surface 111 of the first lens element 110 and the image surface 160 is TL, the following condition is satisfied: TL=2.78 [mm].

When the axial distance between the object-side surface 111 of the first lens element 110 and the image surface 160 is TL, and the focal length of the optical imaging system is f, the following condition is satisfied: TL/f=2.41.

When the axial distance between the object-side surface 111 of the first lens element 110 and the image surface 160 is TL, and a maximum image height of the optical imaging system is ImgH, the following condition is satisfied: TL/ImgH=1.85.

When the focal length of the optical imaging system is f, and the entrance pupil diameter of the optical imaging system is EPD, the following condition is satisfied: f/EPD=2.04.

When an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following condition is satisfied: SD/TD=0.79.

When the maximum image height of the optical imaging system is ImgH, and the focal length of the optical imaging system is f, the following condition is satisfied: ImgH/f=1.30.

When a vertical distance between the critical point on the image-side surface 142 of the fourth lens element 140 and the optical axis is Yc42, and the focal length of the optical imaging system is f, the following condition is satisfied: Yc42/f=0.73.

The detailed optical data of the 1st embodiment are shown in Table 1 and the aspheric surface data are shown in Table 2 below.

TABLE 1

1st Embodiment
f = 1.15 mm, Fno = 2.04, HFOV = 68.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.333 | (ASP) | 0.193 | Plastic | 1.545 | 56.1 | −13.20 |
| 2 | | −1.719 | (ASP) | 0.173 | | | | |
| 3 | Ape. Stop | Plano | | 0.078 | | | | |
| 4 | Lens 2 | −73.302 | (ASP) | 0.200 | Plastic | 1.660 | 20.4 | −29.90 |
| 5 | | 27.027 | (ASP) | 0.046 | | | | |
| 6 | Lens 3 | 68.827 | (ASP) | 0.783 | Plastic | 1.544 | 56.0 | 1.13 |
| 7 | | −0.616 | (ASP) | 0.030 | | | | |
| 8 | Lens 4 | 0.710 | (ASP) | 0.280 | Plastic | 1.660 | 20.4 | −4.59 |
| 9 | | 0.485 | (ASP) | 0.230 | | | | |
| 10 | Stop | Plano | | 0.200 | | | | |
| 11 | Filter | Plano | | 0.210 | Glass | 1.517 | 64.2 | — |
| 12 | | Plano | | 0.358 | | | | |
| 13 | Image | Plano | | — | | | | |

Note:
Reference wavelength is 587.6 nm (d-line).
An effective radius of the stop 101 (Surface 10) is 1.148 mm.

TABLE 2

Aspheric Coefficients

| | Surface # | | | |
|---|---|---|---|---|
| | 1 | 2 | 4 | 5 |
| k = | −2.4222E+01 | −8.7546E+01 | −9.9000E+01 | 2.5938E+01 |
| A4 = | 3.5493E−01 | 4.2045E−01 | −9.4598E−03 | 1.6913E+00 |
| A6 = | −6.8296E−01 | −1.4553E+00 | −1.6988E+01 | −2.0159E+01 |
| A8 = | 5.8195E−01 | 2.0964E+00 | 1.2588E+02 | 7.9089E+01 |
| A10 = | −1.6164E−01 | −1.0886E+00 | −5.4315E+02 | −1.4327E+02 |
| A12 = | −1.1578E−02 | 8.7956E−02 | — | — |

TABLE 2-continued

Aspheric Coefficients

| | Surface # | | | |
|---|---|---|---|---|
| | 6 | 7 | 8 | 9 |
| k = | −9.9000E+01 | −1.9644E+00 | −2.8415E+00 | −1.7800E+00 |
| A4 = | 2.8198E+00 | −7.7080E−02 | −2.9316E−01 | −1.0339E+00 |
| A6 = | −2.2208E+01 | −5.8183E+00 | −2.0114E+00 | 1.9201E+00 |
| A8 = | 9.5391E+01 | 3.5099E+01 | 8.9275E+00 | −3.1143E+00 |
| A10 = | −2.2759E+02 | −1.0013E+02 | −1.8867E+01 | 3.0346E+00 |
| A12 = | 2.8364E+02 | 1.3505E+02 | 1.4554E+01 | −1.5755E+00 |
| A14 = | −1.4199E+02 | −6.3463E+01 | 1.1175E+00 | 3.4195E−01 |
| A16 = | — | — | −3.9465E+00 | — |

In Table 1, the curvature radius, the thickness and the focal length are shown in millimeters (mm). Surface numbers 0-13 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
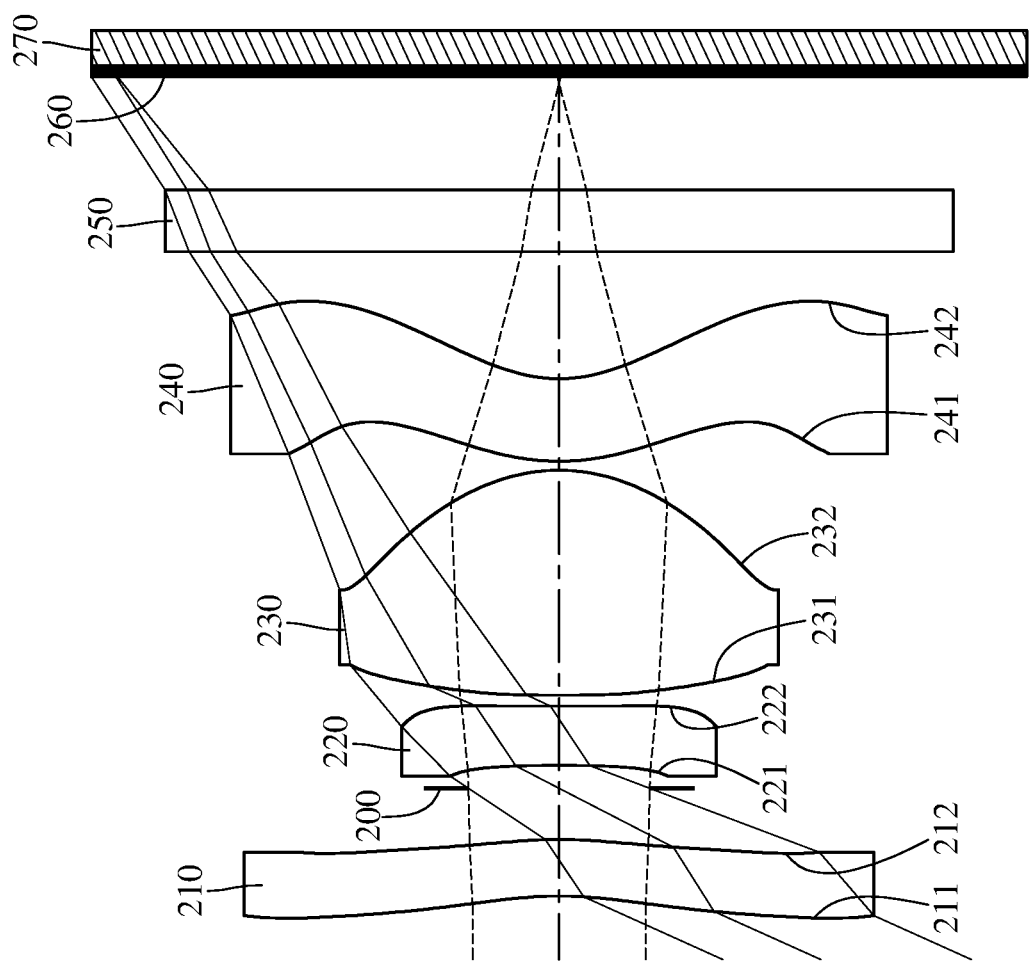
FIG. 3 is a schematic view of an image capturing unit according to the 2nd embodiment of the present disclosure.
Figure 4:
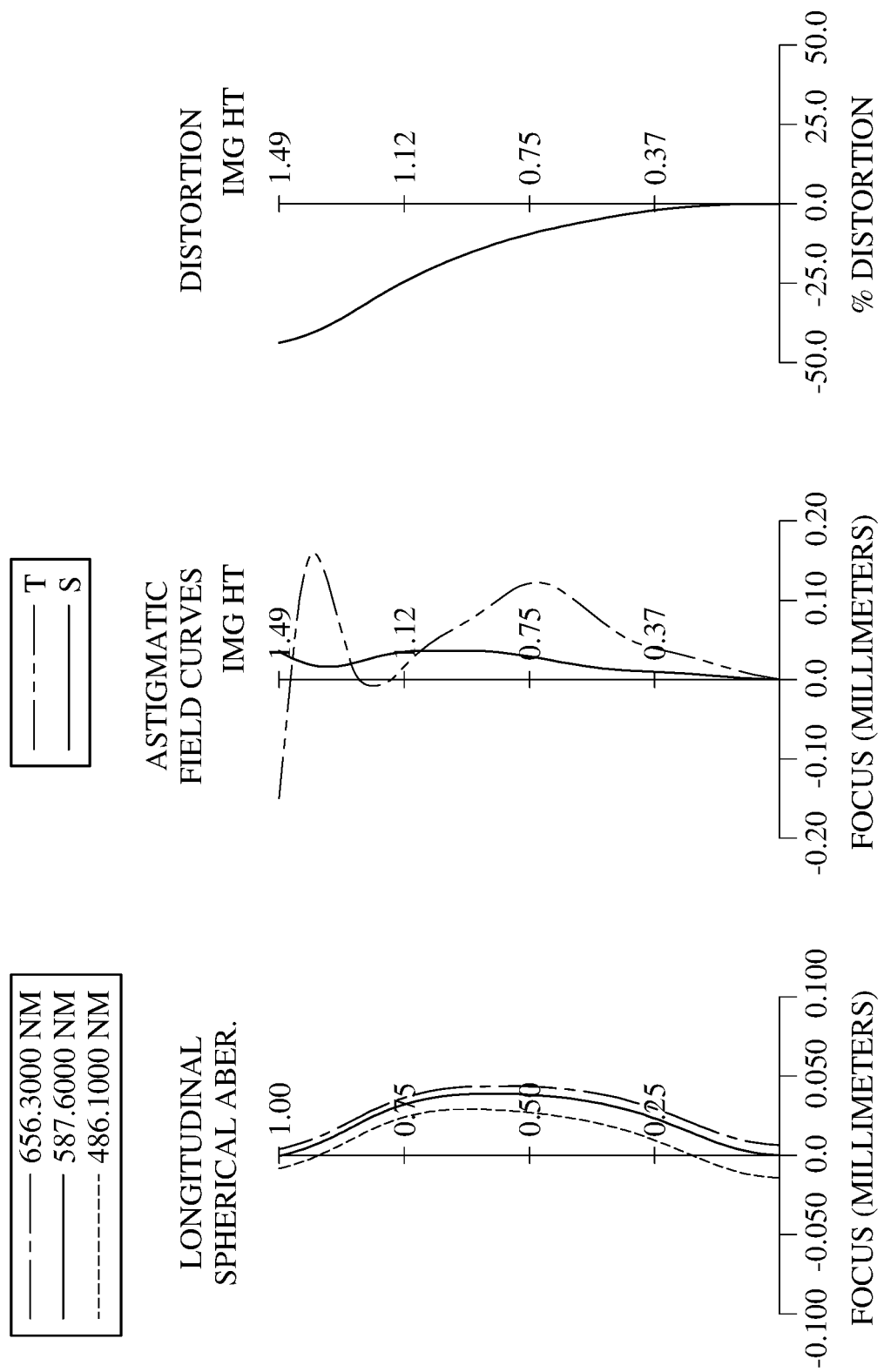
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging system (its reference numeral is omitted) of the present disclosure and an image sensor 270. The optical imaging system includes, in order from an object side to an image side, a first lens element 210, an aperture stop 200, a second lens element 220, a third lens element 230, a fourth lens element 240, a filter 250 and an image surface 260. The optical imaging system includes four lens elements (210, 220, 230 and 240) with no additional lens element disposed between each of the adjacent four lens elements.

The first lens element 210 with positive refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has at least one convex shape in an off-axis region thereof. The object-side surface 211 of the first lens element 210 has one critical point in an off-axis region thereof.

The second lens element 220 with negative refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one convex shape in an off-axis region thereof. The image-side surface 242 of the fourth lens element 240 has one critical point in an off-axis region thereof.

The filter 250 is made of glass material and located between the fourth lens element 240 and the image surface 260, and will not affect the focal length of the optical imaging system. The image sensor 270 is disposed on or near the image surface 260 of the optical imaging system.

In the optical imaging system of the image capturing unit according to the 2nd embodiment, when a vertical distance between the critical point on the object-side surface 211 of the first lens element 210 and an optical axis is Yc11, and a vertical distance between the critical point on the image-side surface 242 of the fourth lens element 240 and the optical axis is Yc42, the following condition is satisfied: Yc11/Yc42=0.78.

The detailed optical data of the 2nd embodiment are shown in Table 3 and the aspheric surface data are shown in Table 4 below.

TABLE 3

2nd Embodiment
f = 1.20 mm, Fno = 2.04, HFOV = 65.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.248 | (ASP) | 0.192 | Plastic | 1.545 | 56.1 | 80.22 |
| 2 | | −1.280 | (ASP) | 0.173 | | | | |
| 3 | Ape. Stop | Plano | | 0.078 | | | | |
| 4 | Lens 2 | −4.190 | (ASP) | 0.201 | Plastic | 1.660 | 20.4 | −9.33 |
| 5 | | −13.363 | (ASP) | 0.037 | | | | |
| 6 | Lens 3 | 191.105 | (ASP) | 0.762 | Plastic | 1.544 | 56.0 | 1.10 |
| 7 | | −0.599 | (ASP) | 0.030 | | | | |
| 8 | Lens 4 | 0.760 | (ASP) | 0.280 | Plastic | 1.660 | 20.4 | −3.75 |
| 9 | | 0.496 | (ASP) | 0.430 | | | | |
| 10 | Filter | Plano | | 0.210 | Glass | 1.517 | 64.2 | — |
| 11 | | Plano | | 0.383 | | | | |
| 12 | Image | Plano | | — | | | | |

Note:
Reference wavelength is 587.6 nm (d-line).

TABLE 4

Aspheric Coefficients

| | Surface # | | | |
|---|---|---|---|---|
| | 1 | 2 | 4 | 5 |
| k = | −2.4372E+01 | −8.3778E+01 | −9.9000E+01 | 2.5938E+01 |
| A4 = | 3.1840E−01 | 2.2917E−01 | 6.1954E−01 | 1.6418E+00 |
| A6 = | −5.1676E−01 | −5.0051E−01 | −3.0153E+01 | −1.7828E+00 |
| A8 = | 3.7278E−01 | 2.6504E−01 | 2.4503E+02 | 6.7802E+01 |

TABLE 4-continued

| Aspheric Coefficients | | | | |
|---|---|---|---|---|
| A10 = | −7.6265E−02 | 3.6530E−01 | −9.1926E+02 | −1.2208E+02 |
| A12 = | −1.0625E−02 | −2.9500E−01 | — | — |

| | Surface # | | | |
|---|---|---|---|---|
| | 6 | 7 | 8 | 9 |
| k = | −9.9000E+01 | −1.9697E+00 | −2.9856E+00 | −1.6406E+00 |
| A4 = | 2.8603E+00 | −3.2141E−01 | −1.8614E−01 | −1.0961E+00 |
| A6 = | −2.2668E+01 | −1.7967E+00 | −1.4373E+00 | 1.6463E+00 |
| A8 = | 9.7724E+01 | 1.0888E+01 | 1.6568E+00 | −2.0156E+00 |
| A10 = | −2.3394E+02 | −3.0289E+01 | 7.2190E+00 | 1.5661E+00 |
| A12 = | 2.9263E+02 | 3.7190E+01 | −2.8164E+01 | −7.0618E−01 |
| A14 = | −1.4709E+02 | −1.0118E+01 | 3.4600E+01 | 1.5150E−01 |
| A16 = | — | — | −1.4218E+01 | — |

In the 2nd embodiment, the equation of the aspheric surface profiles of the aforementioned lens elements is the same as the equation of the 1st embodiment. Also, except for the Yc11 and Yc42 mentioned in this embodiment, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.20 | (R1 − R2)/R1 + R2) | −0.01 |
| Fno | 2.04 | (R5 + R6)/(R5 − R6) | 0.99 |
| HFOV [deg.] | 65.8 | f3/f2 | −0.12 |
| Vmin | 20.40 | f/f1 | 0.01 |
| V1/N1 | 36.30 | f/f2 | −0.13 |
| V2/N2 | 12.29 | f/f4 | −0.32 |
| V3/N3 | 36.26 | \|f/f1\| + \|f/f2\| | 0.14 |
| V4/N4 | 12.29 | TL [mm] | 2.78 |
| V1 − V4 | 35.68 | TL/f | 2.32 |
| T12/CT1 | 1.31 | TL/ImgH | 1.85 |
| EPD/T12 | 2.34 | f/EPD | 2.04 |
| CT2/CT3 | 0.26 | SD/TD | 0.79 |
| (CT1 + CT4 + T23)/CT3 | 0.67 | Yc11/Yc42 | 0.78 |
| (CT1 + CT2 + CT4)/CT3 | 0.88 | ImgH/f | 1.25 |
| (CT3/R1) + (CT3/R2) | −1.21 | Yc42/f | 0.71 |

3rd Embodiment

Figure 5:
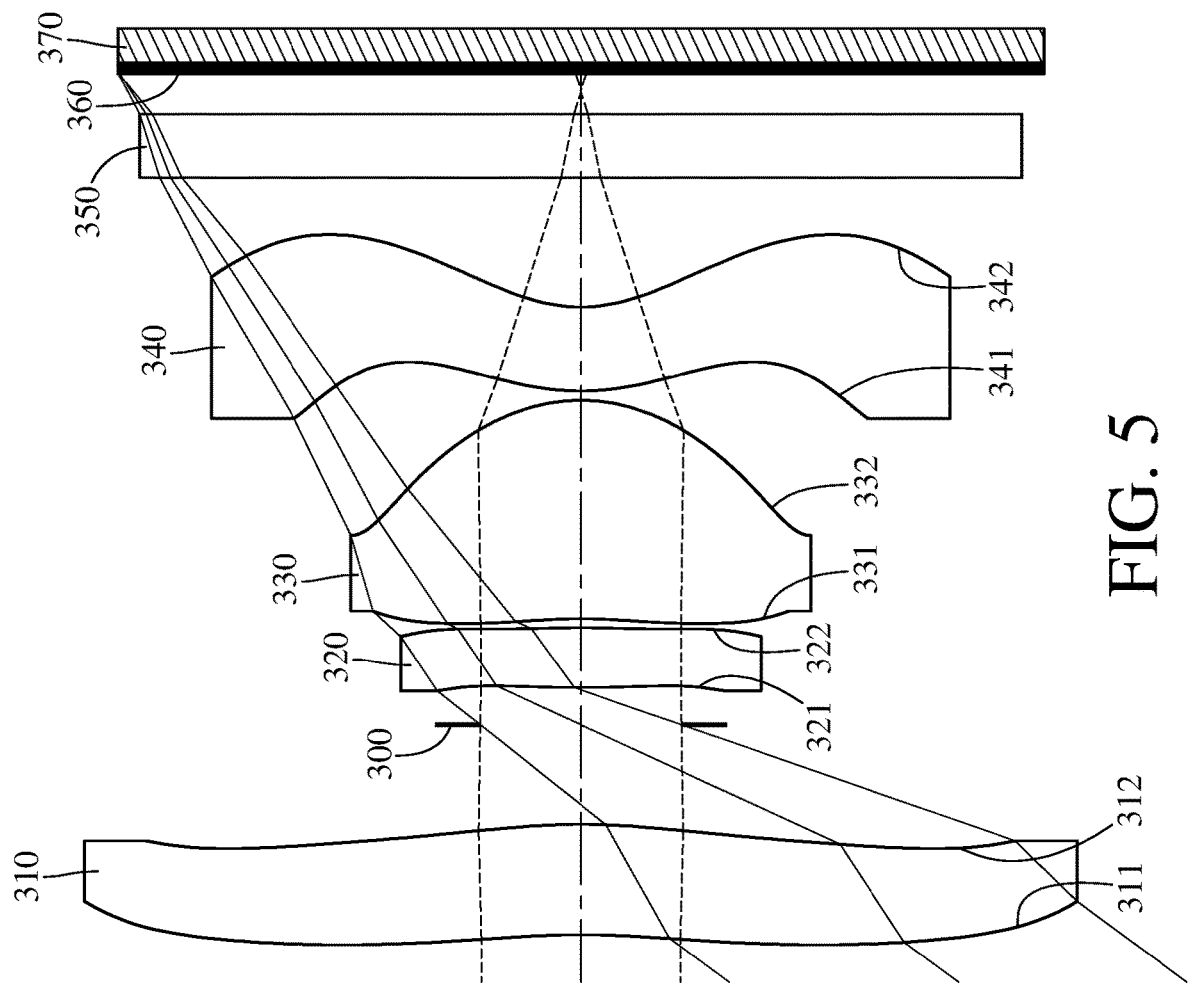
FIG. 5 is a schematic view of an image capturing unit according to the 3rd embodiment of the present disclosure.
Figure 6:
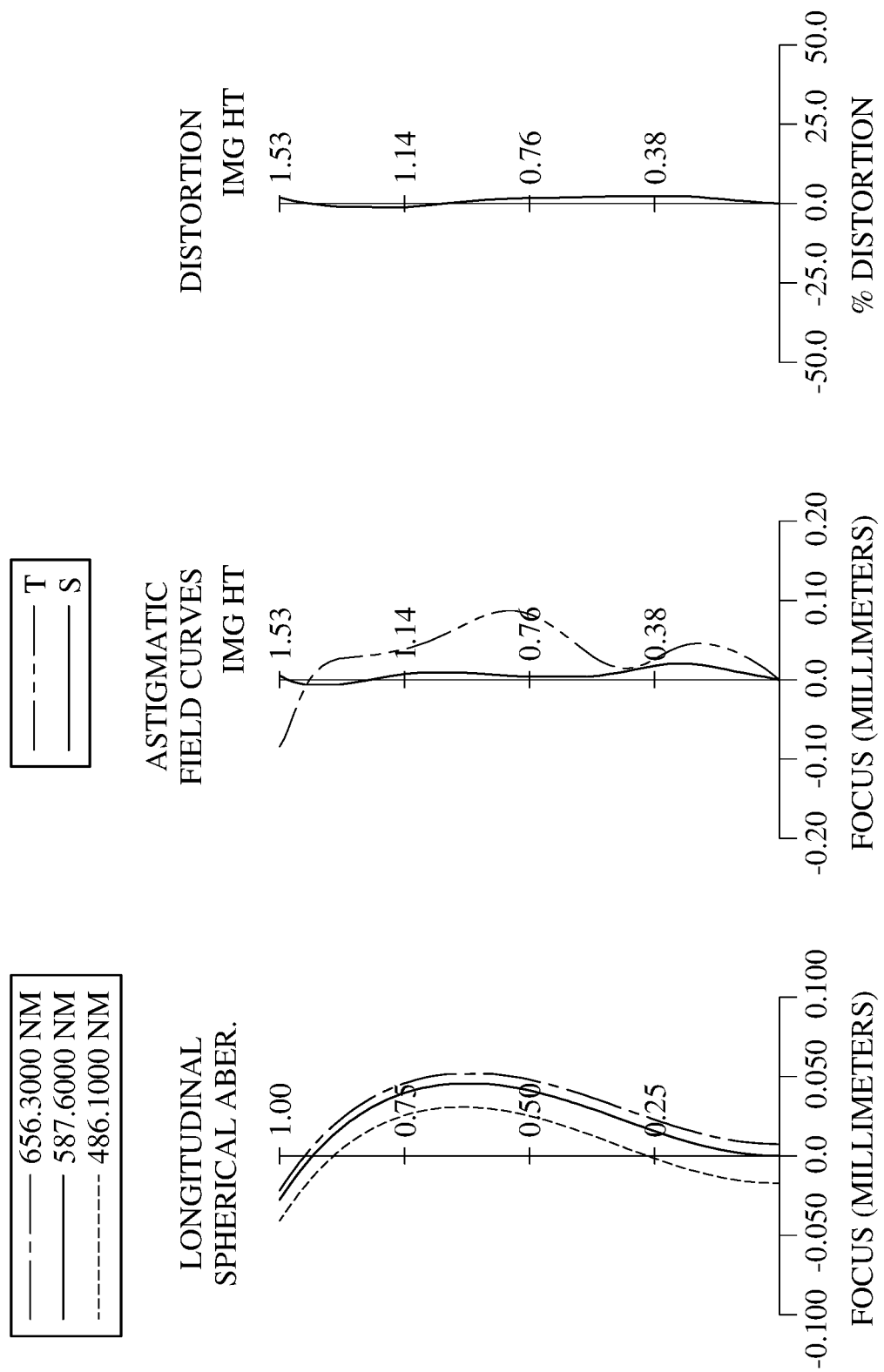
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging system (its reference numeral is omitted) of the present disclosure and an image sensor 370. The optical imaging system includes, in order from an object side to an image side, a first lens element 310, an aperture stop 300, a second lens element 320, a third lens element 330, a fourth lens element 340, a filter 350 and an image surface 360. The optical imaging system includes four lens elements (310, 320, 330 and 340) with no additional lens element disposed between each of the adjacent four lens elements.

The first lens element 310 with positive refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one convex shape in an off-axis region thereof. The object-side surface 311 of the first lens element 310 has one critical point in the off-axis region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one convex shape in an off-axis region thereof. The image-side surface 342 of the fourth lens element 340 has one critical point in the off-axis region thereof.

The filter 350 is made of glass material and located between the fourth lens element 340 and the image surface 360, and will not affect the focal length of the optical imaging system. The image sensor 370 is disposed on or near the image surface 360 of the optical imaging system.

The detailed optical data of the 3rd embodiment are shown in Table 5 and the aspheric surface data are shown in Table 6 below.

TABLE 5

3rd Embodiment
f = 1.10 mm, Fno = 1.66, HFOV = 53.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.708 | (ASP) | 0.366 | Plastic | 1.545 | 56.1 | 10.36 |
| 2 | | −1.918 | (ASP) | 0.330 | | | | |
| 3 | Ape. Stop | Plano | | 0.124 | | | | |
| 4 | Lens 2 | 4.754 | (ASP) | 0.200 | Plastic | 1.614 | 26.0 | 3.42 |
| 5 | | −3.693 | (ASP) | 0.030 | | | | |
| 6 | Lens 3 | −1.659 | (ASP) | 0.725 | Plastic | 1.544 | 56.0 | 1.27 |
| 7 | | −0.563 | (ASP) | 0.030 | | | | |
| 8 | Lens 4 | 0.811 | (ASP) | 0.280 | Plastic | 1.660 | 20.4 | −3.29 |
| 9 | | 0.509 | (ASP) | 0.430 | | | | |
| 10 | Filter | Plano | | 0.210 | Glass | 1.517 | 64.2 | — |
| 11 | | Plano | | 0.135 | | | | |
| 12 | Image | Plano | | — | | | | |

Note:
Reference wavelength is 587.6 nm (d-line).

TABLE 6

Aspheric Coefficients

| Surface # | 1 | 2 | 4 | 5 |
|---|---|---|---|---|
| k = | −9.3697E+01 | −6.2157E+01 | 5.3401E+01 | −9.9000E+01 |
| A4 = | 8.6705E−02 | 6.3448E−02 | −3.1703E−01 | 1.4388E+00 |
| A6 = | −4.7549E−02 | −6.8562E−02 | −2.6502E+00 | −7.2923E+00 |
| A8 = | 9.4051E−03 | 3.6013E−02 | −5.7583E+00 | 1.0989E+01 |
| A10 = | 1.4386E−03 | −5.8932E−03 | 3.8216E+01 | −4.4452E+00 |
| A12 = | −3.8879E−04 | −7.6610E−06 | — | — |

| Surface # | 6 | 7 | 8 | 9 |
|---|---|---|---|---|
| k = | −2.3502E+01 | −1.9103E+00 | −8.0880E+00 | −1.4087E+00 |
| A4 = | 1.7058E+00 | −7.6321E−02 | 4.7186E−01 | −1.3674E+00 |
| A6 = | −7.9700E+00 | −5.7976E+00 | −5.1179E+00 | 1.9320E+00 |
| A8 = | 2.1050E+01 | 3.5879E+01 | 1.4621E+01 | −2.0139E+00 |
| A10 = | −2.6716E+01 | −1.1106E+02 | −2.6785E+01 | 1.3154E+00 |
| A12 = | 1.5243E+01 | 1.6646E+02 | 3.0004E+01 | −4.7699E−01 |
| A14 = | −3.1588E+00 | −9.0983E+01 | −1.8232E+01 | 7.3583E−02 |
| A16 = | — | — | 4.6395E+00 | — |

In the 3rd embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 3rd embodiment, so an explanation in this regard will not be provided again.

Moreover, these parameters can be calculated from Table 5 and Table 6 as the following values and satisfy the following conditions:

3rd Embodiment

| | | | |
|---|---|---|---|
| f [mm] | 1.10 | (R1 − R2)/(R1 + R2) | 0.17 |
| Fno | 1.66 | (R5 + R6)/(R5 − R6) | 2.03 |
| HFOV [deg.] | 53.5 | f3/f2 | 0.37 |
| Vmin | 20.40 | f/f1 | 0.11 |
| V1/N1 | 36.30 | f/f2 | 0.32 |
| V2/N2 | 16.09 | f/f4 | −0.33 |
| V3/N3 | 36.26 | |f/f1| + |f/f2| | 0.43 |
| V4/N4 | 12.29 | TL [mm] | 2.86 |
| V1 − V4 | 35.68 | TL/f | 2.60 |
| T12/CT1 | 1.24 | TL/ImgH | 1.87 |
| EPD/T12 | 1.46 | f/EPD | 1.66 |
| CT2/CT3 | 0.28 | SD/TD | 0.67 |
| (CT1 + CT4 + T23)/CT3 | 0.93 | Yc11/Yc42 | 0.66 |
| (CT1 + CT2 + CT4)/CT3 | 1.17 | ImgH/f | 1.39 |
| (CT3/R1) + (CT3/R2) | −0.65 | Yc42/f | 0.76 |

4th Embodiment

Figure 7:
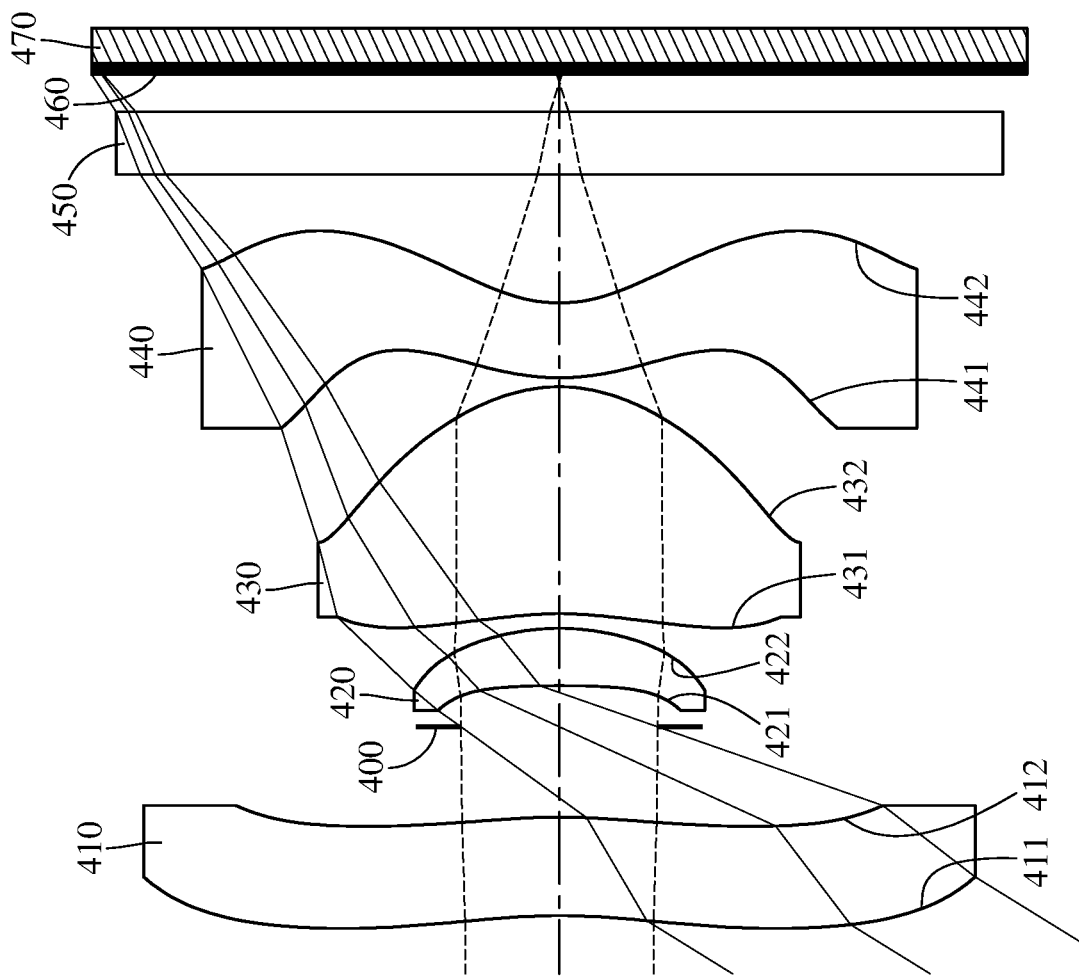
FIG. 7 is a schematic view of an image capturing unit according to the 4th embodiment of the present disclosure.
Figure 8:
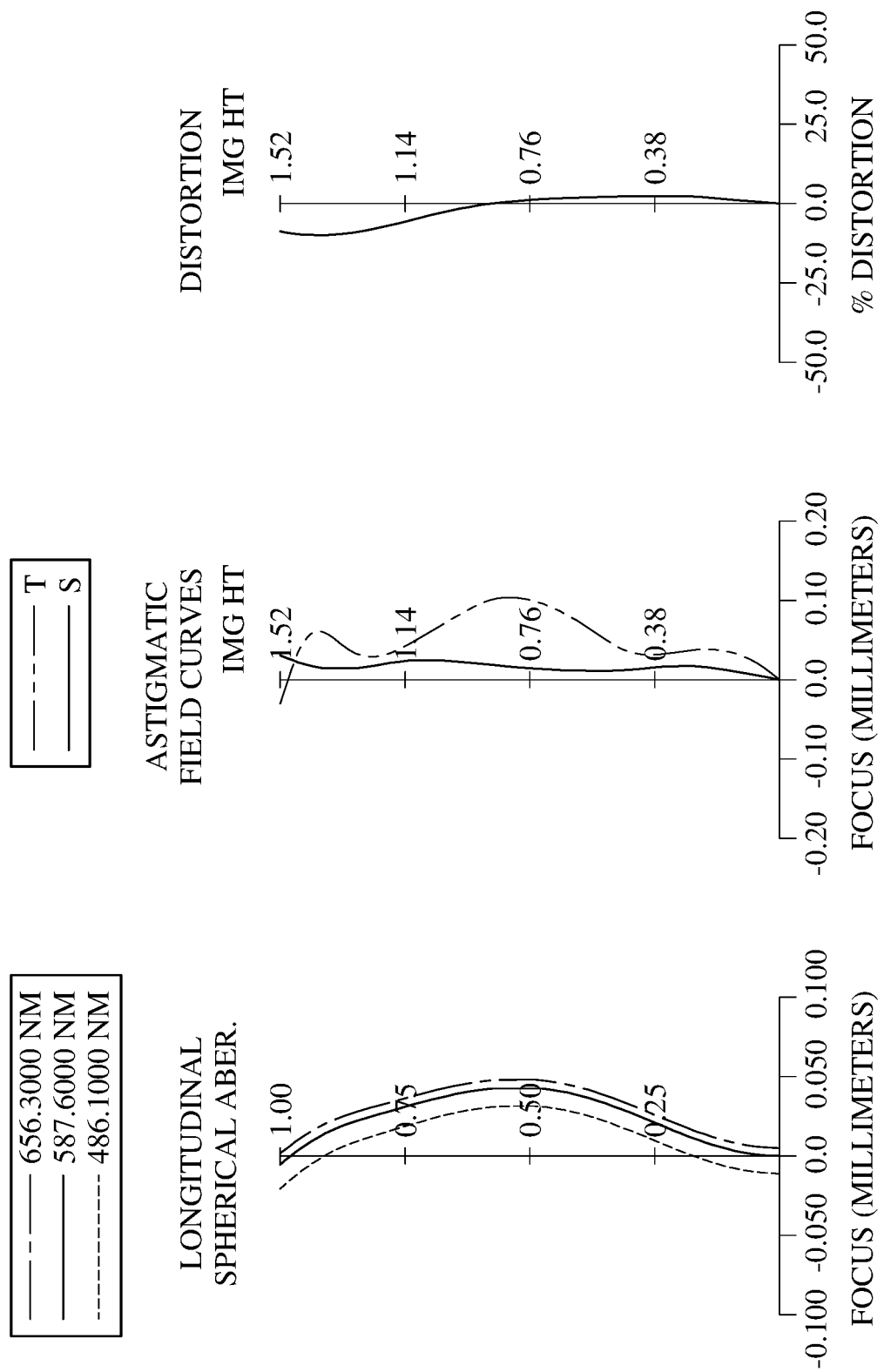
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging system (its reference numeral is omitted) of the present disclosure and an image sensor 470. The optical imaging system includes, in order from an object side to an image side, a first lens element 410, an aperture stop 400, a second lens element 420, a third lens element 430, a fourth lens element 440, a filter 450 and an image surface 460. The optical imaging system includes four lens elements (410, 420, 430 and 440) with no additional lens element disposed between each of the adjacent four lens elements.

The first lens element 410 with positive refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one convex shape in an off-axis region thereof. The object-side surface 411 of the first lens element 410 has one critical point in the off-axis region thereof.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one convex shape in an off-axis region thereof. The image-side surface 442 of the fourth lens element 440 has one critical point in the off-axis region thereof.

The filter 450 is made of glass material and located between the fourth lens element 440 and the image surface 460, and will not affect the focal length of the optical imaging system. The image sensor 470 is disposed on or near the image surface 460 of the optical imaging system.

The detailed optical data of the 4th embodiment are shown in Table 7 and the aspheric surface data are shown in Table 8 below.

TABLE 7

4th Embodiment
f = 1.03 mm, Fno = 1.63, HFOV = 58.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.825 | (ASP) | 0.329 | Plastic | 1.545 | 56.1 | 135.11 |
| 2 | | −1.894 | (ASP) | 0.302 | | | | |
| 3 | Ape. Stop | Plano | | 0.138 | | | | |
| 4 | Lens 2 | −4.016 | (ASP) | 0.192 | Plastic | 1.534 | 55.9 | 1.71 |
| 5 | | −0.756 | (ASP) | 0.049 | | | | |
| 6 | Lens 3 | −1.138 | (ASP) | 0.759 | Plastic | 1.534 | 55.9 | 1.30 |
| 7 | | −0.532 | (ASP) | 0.030 | | | | |
| 8 | Lens 4 | 0.773 | (ASP) | 0.250 | Plastic | 1.669 | 19.5 | −2.42 |
| 9 | | 0.455 | (ASP) | 0.430 | | | | |

TABLE 7-continued

4th Embodiment
f = 1.03 mm, Fno = 1.63, HFOV = 58.3 deg.

| Surface # | | Curvature Radius | Thickness | Material | Index | Abbe # | Focal Length |
|---|---|---|---|---|---|---|---|
| 10 | Filter | Plano | 0.210 | Glass | 1.517 | 64.2 | — |
| 11 | | Plano | 0.125 | | | | |
| 12 | Image | Plano | — | | | | |

Note:
Reference wavelength is 587.6 nm (d-line).

TABLE 8

Aspheric Coefficients

| Surface # | | | | |
|---|---|---|---|---|
| | 1 | 2 | 4 | 5 |
| k = | −5.9300E+01 | −9.9000E+01 | 4.4427E+01 | −2.8356E+00 |
| A4 = | 1.1635E−01 | 1.2522E−01 | −1.3460E+00 | 8.9398E−01 |
| A6 = | −5.6199E−02 | −2.9372E−02 | 3.8831E+00 | −1.4426E+01 |
| A8 = | 1.3113E−02 | −1.2886E−01 | −8.1220E+01 | 4.2136E+01 |
| A10 = | 3.8895E−03 | 1.9459E−01 | 1.6279E+02 | −8.6052E+01 |
| A12 = | −6.4648E−04 | −6.9486E−02 | — | — |

| Surface # | | | | |
|---|---|---|---|---|
| | 6 | 7 | 8 | 9 |
| k = | −7.9502E+00 | −2.1314E+00 | −9.3282E+00 | −1.8735E+00 |
| A4 = | 2.0666E+00 | 1.9348E−02 | 9.5984E−01 | −1.1664E+00 |
| A6 = | −1.3812E+01 | −3.9866E+00 | −9.1320E+00 | 1.6899E+00 |
| A8 = | 5.3572E+01 | 1.6916E+01 | 2.8427E+01 | −1.8271E+00 |
| A10 = | −1.1041E+02 | −3.8721E+01 | −5.5384E+01 | 1.1970E+00 |
| A12 = | 1.1731E+02 | 4.3705E+01 | 6.2421E+01 | −4.3223E−01 |
| A14 = | −5.0526E+01 | −1.7071E+01 | −3.5921E+01 | 7.1513E−02 |
| A16 = | — | — | 8.1496E+00 | — |

In the 4th embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.03 | (R1 − R2)/(R1 + R2) | −0.02 |
| Fno | 1.63 | (R5 + R6)/(R5 − R6) | 2.75 |
| HFOV [deg.] | 58.3 | f3/f2 | 0.76 |
| Vmin | 19.45 | f/f1 | 0.01 |
| V1/N1 | 36.30 | f/f2 | 0.60 |
| V2/N2 | 36.46 | f/f4 | −0.42 |
| V3/N3 | 36.46 | |f/f1| + |f/f2| | 0.61 |
| V4/N4 | 11.66 | TL [mm] | 2.81 |
| V1 − V4 | 36.62 | TL/f | 2.74 |
| T12/CT1 | 1.34 | TL/ImgH | 1.84 |
| EPD/T12 | 1.43 | f/EPD | 1.63 |
| CT2/CT3 | 0.25 | SD/TD | 0.69 |
| (CT1 + CT4 + T23)/CT3 | 0.83 | Yc11/Yc42 | 0.58 |
| (CT1 + CT2 + CT4)/CT3 | 1.02 | ImgH/f | 1.49 |
| (CT3/R1) + (CT3/R2) | −0.82 | Yc42/f | 0.78 |

5th Embodiment

Figure 9:
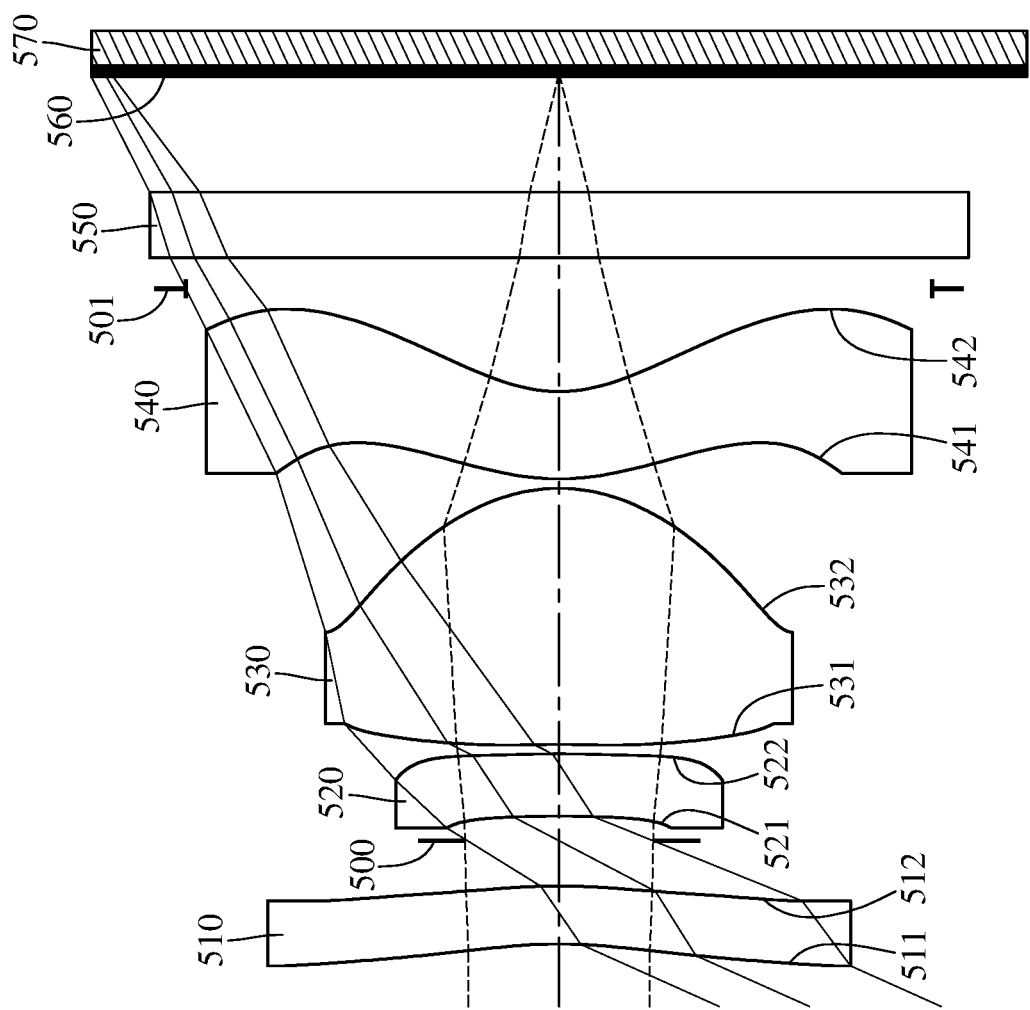
FIG. 9 is a schematic view of an image capturing unit according to the 5th embodiment of the present disclosure.
Figure 10:
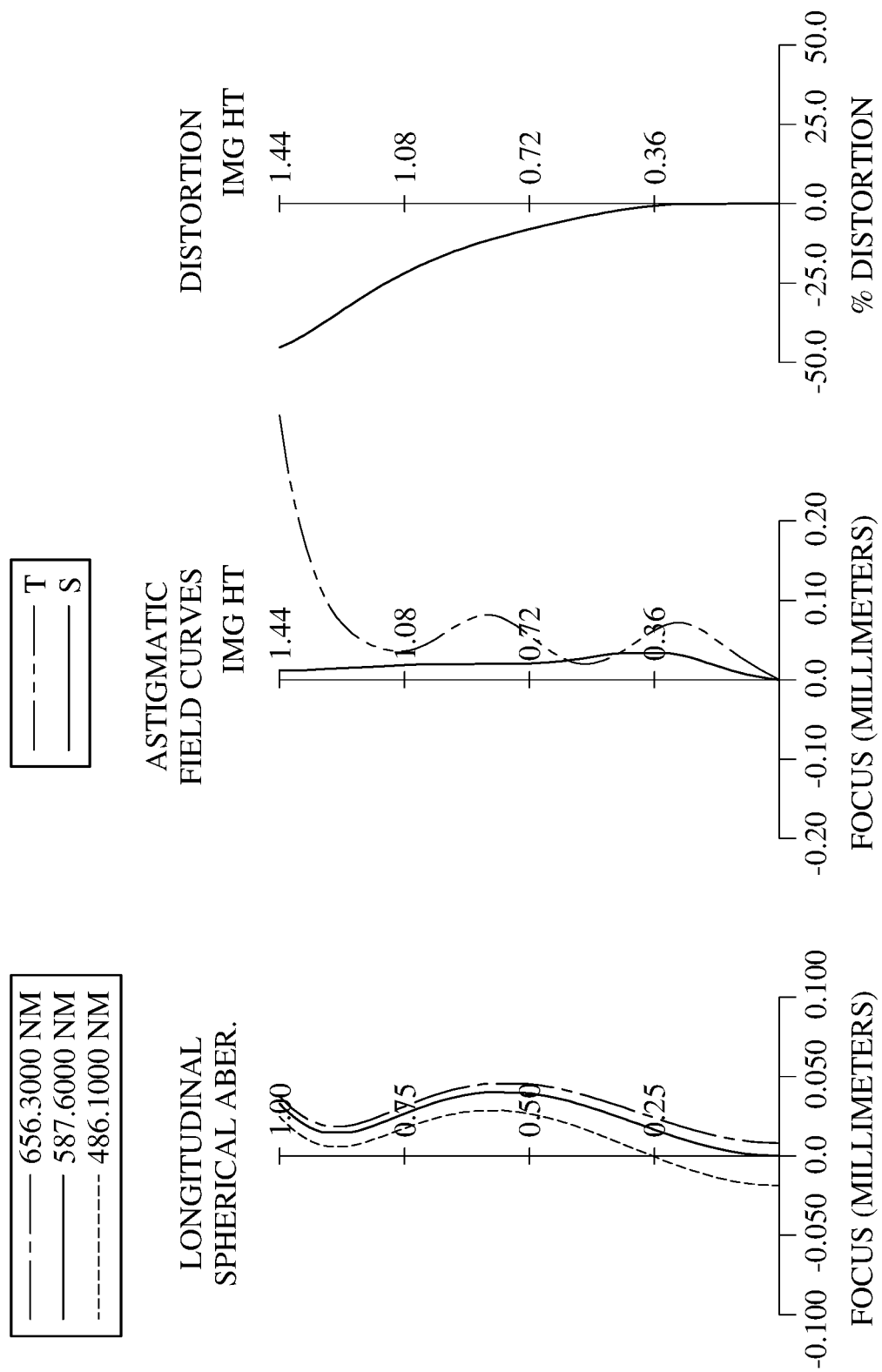
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging system (its reference numeral is omitted) of the present disclosure and an image sensor 570. The optical imaging system includes, in order from an object side to an image side, a first lens element 510, an aperture stop 500, a second lens element 520, a third lens element 530, a fourth lens element 540, a stop 501, a filter 550 and an image surface 560. The optical imaging system includes four lens elements (510, 520, 530 and 540) with no additional lens element disposed between each of the adjacent four lens elements.

The first lens element 510 with negative refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has at least one convex shape in an off-axis region thereof. The object-side surface 511 of the first lens element 510 has one critical point in the off-axis region thereof.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The image-side surface 542 of the fourth lens element 540 has at least one convex shape in an off-axis region thereof. The image-side surface 542 of the fourth lens element 540 has one critical point in the off-axis region thereof.

The filter 550 is made of glass material and located between the fourth lens element 540 and the image surface 560, and will not affect the focal length of the optical imaging system. The image sensor 570 is disposed on or near the image surface 560 of the optical imaging system.

The detailed optical data of the 5th embodiment are shown in Table 9 and the aspheric surface data are shown in Table 10 below.

TABLE 9

5th Embodiment
f = 1.19 mm, Fno = 2.04, HFOV = 65.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.520 | (ASP) | 0.186 | Plastic | 1.545 | 56.1 | −29.02 |
| 2 | | −1.754 | (ASP) | 0.145 | | | | |
| 3 | Ape. Stop | Plano | | 0.079 | | | | |
| 4 | Lens 2 | −4.398 | (ASP) | 0.200 | Plastic | 1.660 | 20.4 | 14.99 |
| 5 | | −3.099 | (ASP) | 0.030 | | | | |
| 6 | Lens 3 | −3.852 | (ASP) | 0.822 | Plastic | 1.544 | 56.0 | 1.08 |
| 7 | | −0.549 | (ASP) | 0.030 | | | | |
| 8 | Lens 4 | 0.764 | (ASP) | 0.280 | Plastic | 1.660 | 20.4 | −2.68 |
| 9 | | 0.455 | (ASP) | 0.330 | | | | |
| 10 | Stop | Plano | | 0.100 | | | | |
| 11 | Filter | Plano | | 0.210 | Glass | 1.517 | 64.2 | — |
| 12 | | Plano | | 0.370 | | | | |
| 13 | Image | Plano | | — | | | | |

Note:
Reference wavelength is 587.6 nm (d-line).
An effective radius of the stop 501 (Surface 10) is 1.196 mm.

TABLE 10

Aspheric Coefficients

| Surface # | | | | |
|---|---|---|---|---|
| | 1 | 2 | 4 | 5 |
| k = | −2.5169E+01 | −7.2539E+01 | 5.2898E+01 | −9.5951E+01 |
| A4 = | 3.5799E−01 | 3.6014E−01 | 1.8884E−01 | 1.9560E+00 |
| A6 = | −6.8343E−01 | −1.2548E+00 | −1.5380E+00 | −1.9289E+01 |
| A8 = | 5.5696E−01 | 1.7284E+00 | 1.2862E+02 | 7.3309E+01 |
| A10 = | −1.3731E−01 | −7.7396E−01 | −7.6095E+02 | −1.4084E+02 |
| A12 = | −1.1578E−02 | — | — | — |

| Surface # | | | | |
|---|---|---|---|---|
| | 6 | 7 | 8 | 9 |
| k = | −9.9000E+01 | −1.7570E+00 | −4.6011E+00 | −3.3273E+00 |
| A4 = | 2.9465E+00 | −4.1326E−01 | −7.5104E−01 | −2.4398E−01 |
| A6 = | −2.3758E+01 | −1.2501E+00 | 3.4605E+00 | −1.6036E−01 |
| A8 = | 1.1072E+02 | 1.1502E+01 | −1.5438E+01 | 4.5116E−01 |
| A10 = | −2.9306E+02 | −4.2757E+01 | 3.8323E+01 | −4.7238E−01 |
| A12 = | 4.0786E+02 | 6.7539E+01 | −5.4924E+01 | 2.1901E−01 |
| A14 = | −2.2833E+02 | −3.3172E+01 | 4.1801E+01 | −3.3361E−02 |
| A16 = | — | — | −1.2944E+01 | — |

In the 5th embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.19 | (R1 − R2)/R1 + R2) | −0.07 |
| Fno | 2.04 | (R5 + R6)/(R5 − R6) | 1.33 |

| 5th Embodiment | | | |
|---|---|---|---|
| HFOV [deg.] | 65.8 | f3/f2 | 0.07 |
| Vmin | 20.40 | f/f1 | −0.04 |
| V1/N1 | 36.30 | f/f2 | 0.08 |
| V2/N2 | 12.29 | f/f4 | −0.44 |
| V3/N3 | 36.26 | \|f/f1\| + \|f/f2\| | 0.12 |
| V4/N4 | 12.29 | TL [mm] | 2.78 |
| V1 − V4 | 35.68 | TL/f | 2.34 |
| T12/CT1 | 1.20 | TL/ImgH | 1.92 |
| EPD/T12 | 2.60 | f/EPD | 2.04 |
| CT2/CT3 | 0.24 | SD/TD | 0.81 |
| (CT1 + CT4 + T23)/CT3 | 0.60 | Yc11/Yc42 | 0.80 |
| (CT1 + CT2 + CT4)/CT3 | 0.81 | ImgH/f | 1.22 |
| (CT3/R1) + (CT3/R2) | −1.01 | Yc42/f | 0.73 |

6th Embodiment

Figure 11:
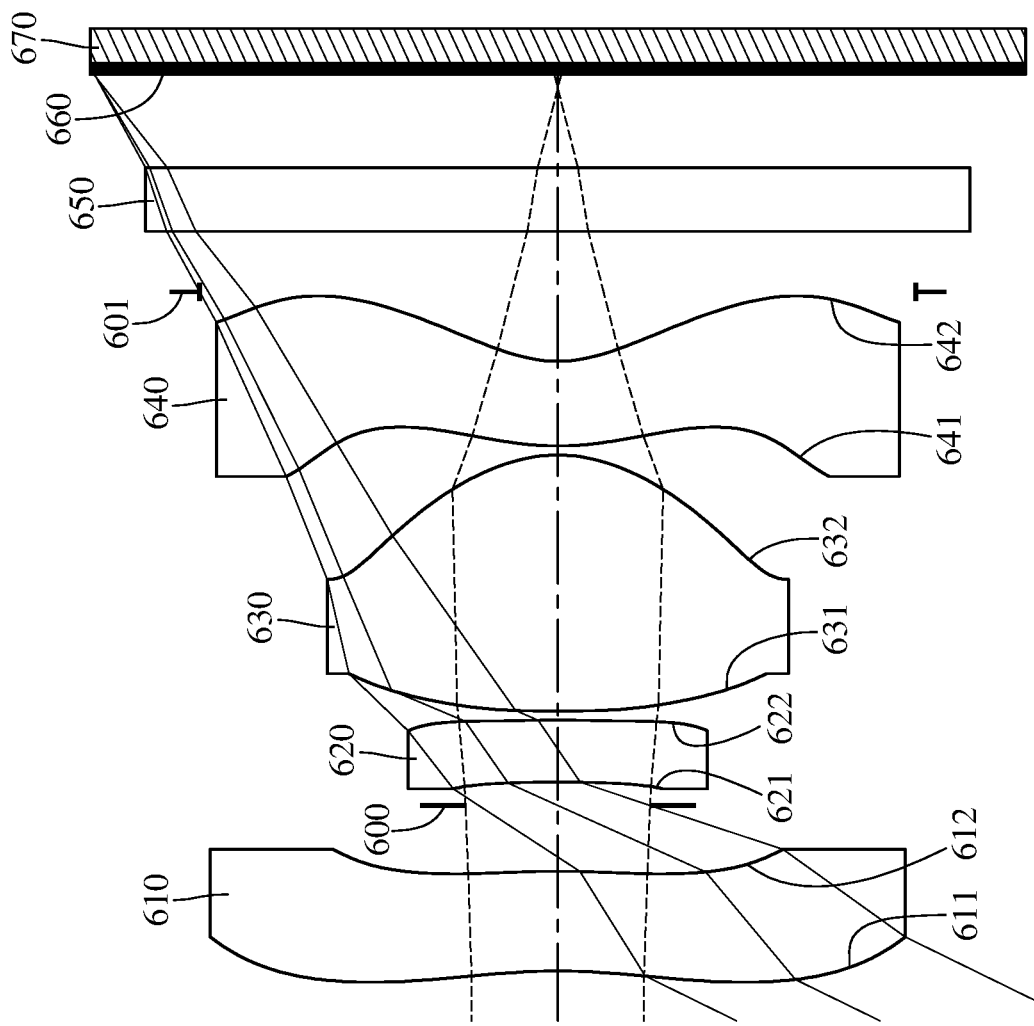
FIG. 11 is a schematic view of an image capturing unit according to the 6th embodiment of the present disclosure.
Figure 12:
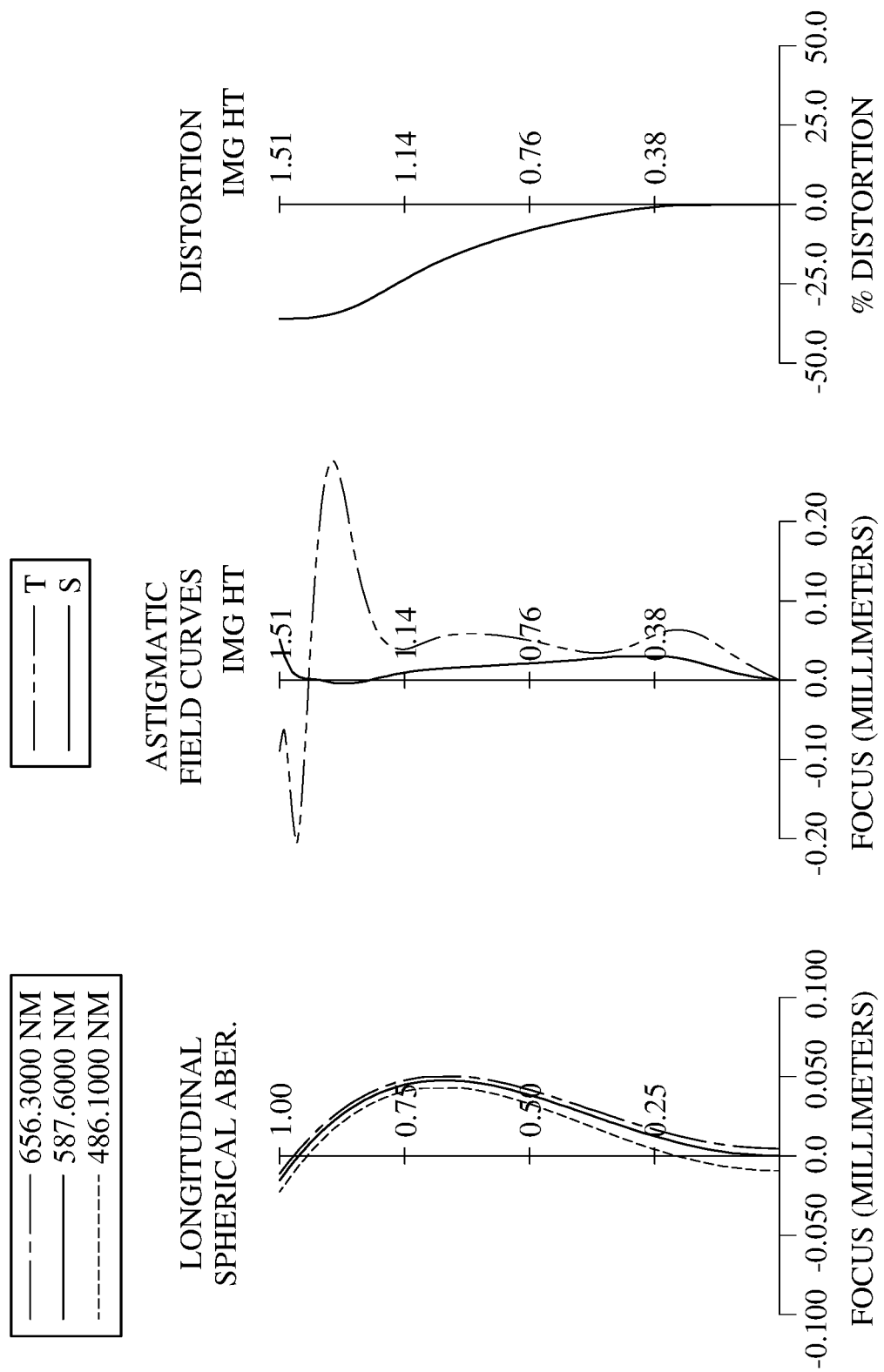
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging system (its reference numeral is omitted) of the present disclosure and an image sensor 670. The optical imaging system includes, in order from an object side to an image side, a first lens element 610, an aperture stop 600, a second lens element 620, a third lens element 630, a fourth lens element 640, a stop 601, a filter 650 and an image surface 660. The optical imaging system includes four lens elements (610, 620, 630 and 640) with no additional lens element disposed between each of the adjacent four lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has at least one convex shape in an off-axis region thereof. The object-side surface 611 of the first lens element 610 has one critical point in the off-axis region thereof.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The image-side surface 642 of the fourth lens element 640 has at least one convex shape in an off-axis region thereof. The image-side surface 642 of the fourth lens element 640 has one critical point in the off-axis region thereof.

The filter 650 is made of glass material and located between the fourth lens element 640 and the image surface 660, and will not affect the focal length of the optical imaging system. The image sensor 670 is disposed on or near the image surface 660 of the optical imaging system.

The detailed optical data of the 6th embodiment are shown in Table 11 and the aspheric surface data are shown in Table 12 below.

TABLE 11

6th Embodiment
f = 1.16 mm, Fno = 2.04, HFOV = 63.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.940 | (ASP) | 0.330 | Plastic | 1.545 | 56.1 | −14.00 |
| 2 | | −2.758 | (ASP) | 0.218 | | | | |
| 3 | Ape. Stop | Plano | | 0.077 | | | | |
| 4 | Lens 2 | −4.554 | (ASP) | 0.205 | Plastic | 1.660 | 20.4 | 44.53 |
| 5 | | −4.014 | (ASP) | 0.030 | | | | |
| 6 | Lens 3 | 10.139 | (ASP) | 0.847 | Plastic | 1.544 | 56.0 | 0.87 |
| 7 | | −0.483 | (ASP) | 0.030 | | | | |
| 8 | Lens 4 | 0.956 | (ASP) | 0.280 | Plastic | 1.660 | 20.4 | −1.47 |
| 9 | | 0.425 | (ASP) | 0.230 | | | | |
| 10 | Stop | Plano | | 0.200 | | | | |
| 11 | Filter | Plano | | 0.210 | Glass | 1.517 | 64.2 | — |
| 12 | | Plano | | 0.308 | | | | |
| 13 | Image | Plano | | — | | | | |

Note:
Reference wavelength is 587.6 nm (d-line).
An effective radius of the stop 601 (Surface 10) is 1.183 mm.

TABLE 12

Aspheric Coefficients

| Surface # | | | | |
|---|---|---|---|---|
| | 1 | 2 | 4 | 5 |
| k = | −3.2933E+01 | −9.9000E+01 | 1.0468E+01 | 1.3922E+01 |
| A4 = | 2.4907E−01 | 7.7212E−01 | 5.6295E−02 | 2.0382E+00 |
| A6 = | −2.2360E−01 | −2.2246E+00 | −6.0908E+00 | −1.7324E+01 |
| A8 = | 1.6700E−01 | 4.6941E+00 | 5.7549E+00 | 5.8728E+01 |
| A10 = | −4.0553E−02 | −3.3714E+00 | −2.2020E+01 | −9.3547E+01 |

| Surface # | | | | |
|---|---|---|---|---|
| | 6 | 7 | 8 | 9 |
| k = | −5.8971E+01 | −2.2675E+00 | −6.7480E+00 | −3.7271E+00 |
| A4 = | 2.5842E+00 | 2.3642E−01 | −6.0665E−01 | −5.4329E−01 |
| A6 = | −1.9966E+01 | −8.1181E+00 | −3.7371E−01 | 5.7747E−01 |
| A8 = | 8.9488E+01 | 4.4739E+01 | 1.7761E+00 | −4.6239E−01 |
| A10 = | −2.2574E+02 | −1.2577E+02 | 1.0342E+00 | 3.2400E−02 |
| A12 = | 3.0166E+02 | 1.7967E+02 | −1.5997E+01 | 1.5530E−01 |
| A14 = | −1.6566E+02 | −9.7771E+01 | 2.5865E+01 | −5.2106E−02 |
| A16 = | — | — | −1.2272E+01 | — |

In the 6th embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.16 | (R1 − R2)/R1 + R2) | −0.17 |
| Fno | 2.04 | (R5 + R6)/(R5 − R6) | 0.91 |
| HFOV [deg.] | 63.9 | f3/f2 | 0.02 |
| Vmin | 20.40 | f/f1 | −0.08 |
| V1/N1 | 36.30 | f/f2 | 0.03 |
| V2/N2 | 12.29 | f/f4 | −0.79 |
| V3/N3 | 36.26 | |f/f1| + |f/f2| | 0.11 |
| V4/N4 | 12.29 | TL [mm] | 2.97 |
| V1 − V4 | 35.68 | TL/f | 2.55 |
| T12/CT1 | 0.89 | TL/ImgH | 1.94 |
| EPD/T12 | 1.93 | f/EPD | 2.04 |
| CT2/CT3 | 0.24 | SD/TD | 0.73 |
| (CT1 + CT4 + T23)/CT3 | 0.76 | Yc11/Yc42 | 0.49 |
| (CT1 + CT2 + CT4)/CT3 | 0.96 | ImgH/f | 1.32 |
| (CT3/R1) + (CT3/R2) | −0.74 | Yc42/f | 0.68 |

7th Embodiment

Figure 13:
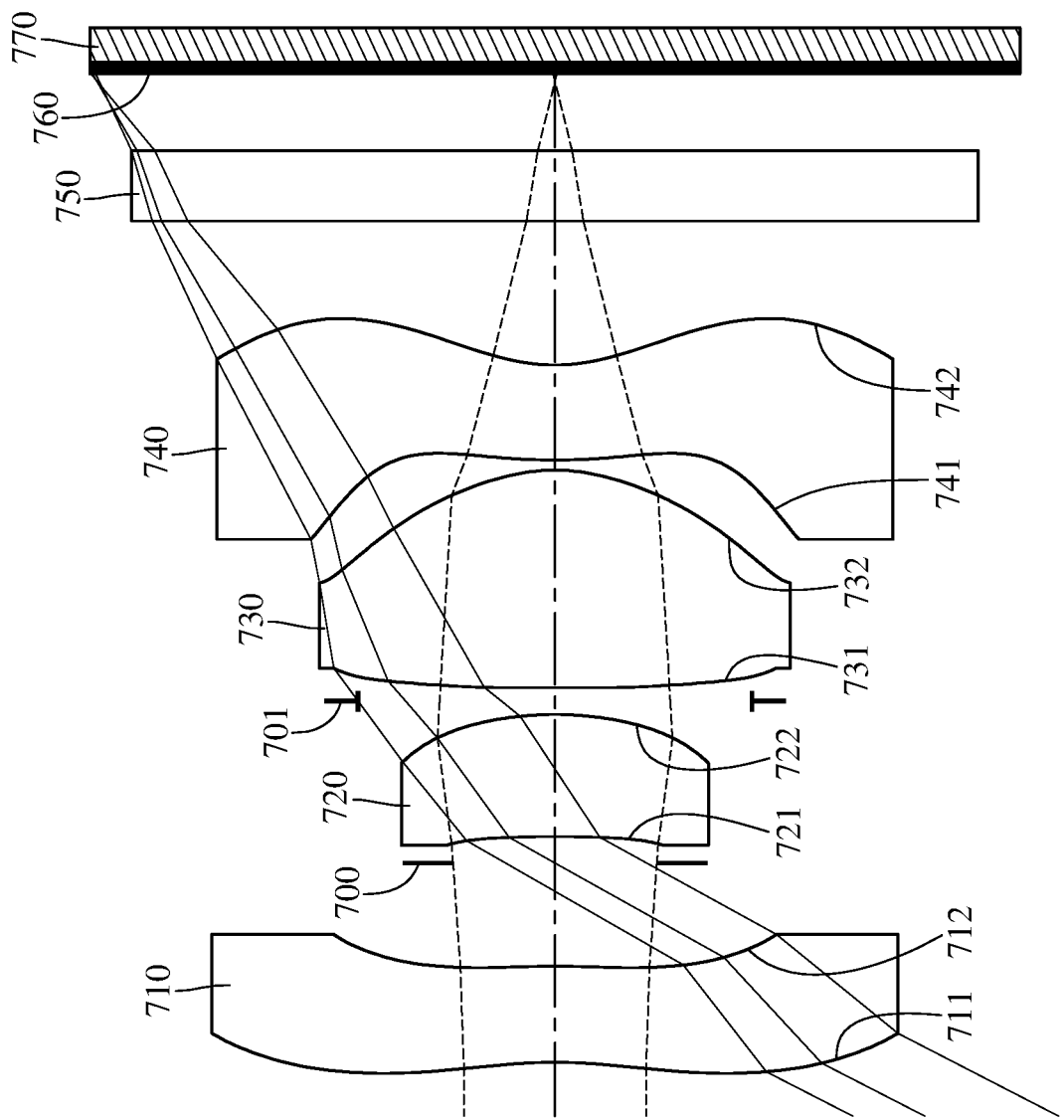
FIG. 13 is a schematic view of an image capturing unit according to the 7th embodiment of the present disclosure.
Figure 14:
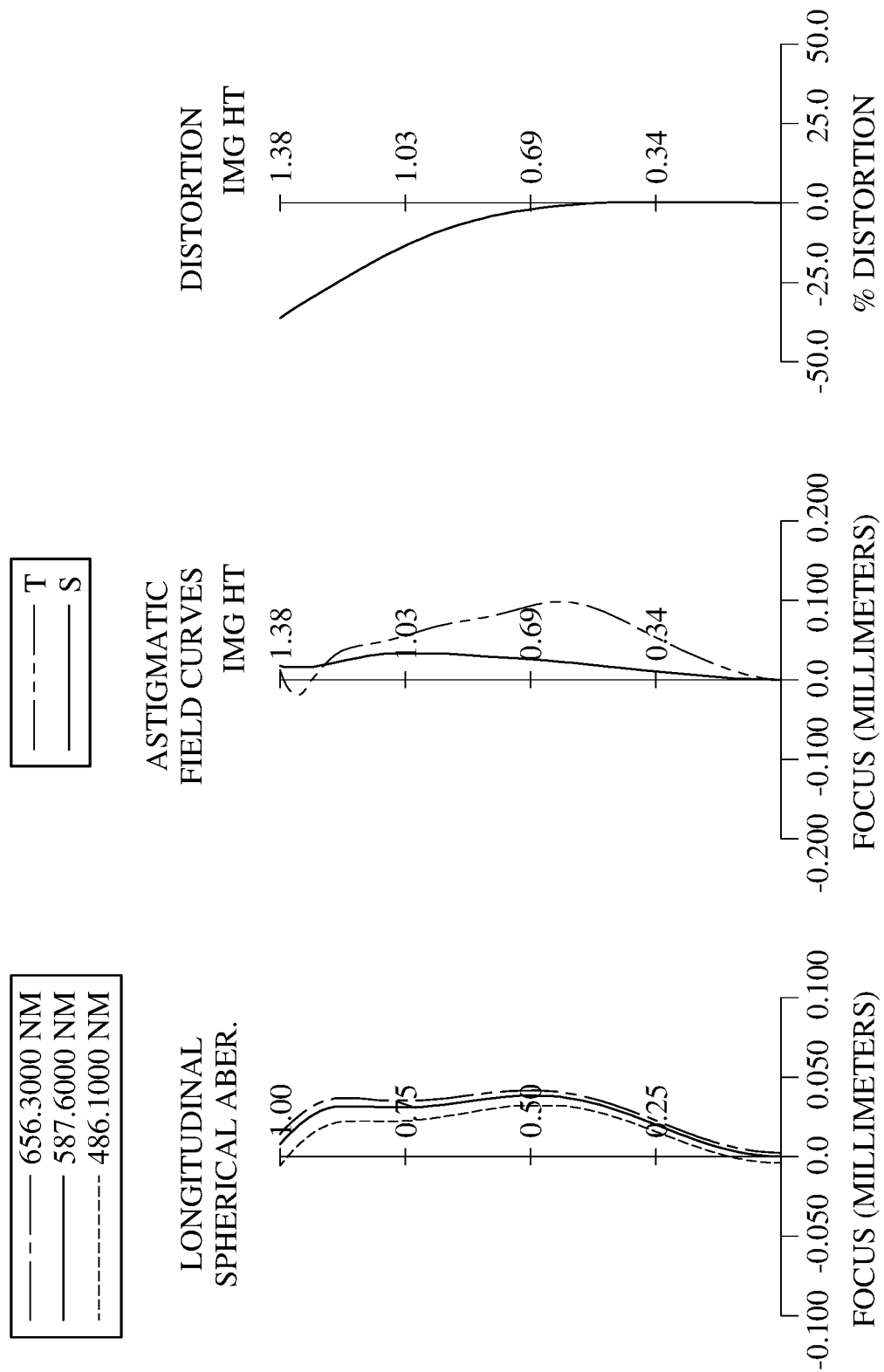
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging system (its reference numeral is omitted) of the present disclosure and an image sensor 770. The optical imaging system includes, in order from an object side to an image side, a first lens element 710, an aperture stop 700, a second lens element 720, a stop 701, a third lens element 730, a fourth lens element 740, a filter 750 and an image surface 760. The optical imaging system includes four lens elements (710, 720, 730 and 740) with no additional lens element disposed between each of the adjacent four lens elements.

The first lens element 710 with negative refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has at least one convex shape in an off-axis region thereof. The object-side surface 711 of the first lens element 710 has one critical point in the off-axis region thereof.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one convex shape in an off-axis region thereof. The image-side surface 742 of the fourth lens element 740 has one critical point in the off-axis region thereof.

The filter 750 is made of glass material and located between the fourth lens element 740 and the image surface 760, and will not affect the focal length of the optical imaging system. The image sensor 770 is disposed on or near the image surface 760 of the optical imaging system.

The detailed optical data of the 7th embodiment are shown in Table 13 and the aspheric surface data are shown in Table 14 below.

TABLE 13

7th Embodiment
f = 1.11 mm, Fno = 2.04, HFOV = 62.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −1.386 (ASP) | 0.287 | Plastic | 1.545 | 56.1 | −5.70 |
| 2 | | −2.686 (ASP) | 0.308 | | | | |
| 3 | Ape. Stop | Plano | 0.079 | | | | |
| 4 | Lens 2 | −4.619 (ASP) | 0.365 | Plastic | 1.544 | 56.0 | 2.05 |
| 5 | | −0.925 (ASP) | 0.040 | | | | |
| 6 | Stop | Plano | 0.040 | | | | |
| 7 | Lens 3 | −12.950 (ASP) | 0.650 | Plastic | 1.534 | 55.9 | 1.03 |
| 8 | | −0.534 (ASP) | 0.030 | | | | |
| 9 | Lens 4 | 1.878 (ASP) | 0.284 | Plastic | 1.660 | 20.4 | −1.29 |
| 10 | | 0.550 (ASP) | 0.430 | | | | |
| 11 | Filter | Plano | 0.210 | Glass | 1.517 | 64.2 | — |
| 12 | | Plano | 0.231 | | | | |
| 13 | Image | Plano | — | | | | |

Note:
Reference wavelength is 587.6 nm (d-line).
An effective radius of the stop 701 (Surface 6) is 0.588 mm.

TABLE 14

Aspheric Coefficients

| Surface # | | | | |
|---|---|---|---|---|
| | 1 | 2 | 4 | 5 |
| k = | −3.4507E+01 | −1.6397E+01 | −4.5872E+01 | −1.7973E+00 |
| A4 = | 4.4099E−01 | 2.2466E+00 | −1.8016E−03 | 2.3442E+00 |
| A6 = | −3.1124E−01 | −8.6774E+00 | −3.5757E+01 | −6.5438E+01 |
| A8 = | −8.8373E−01 | 1.5787E+01 | 5.6097E+02 | 8.1145E+02 |
| A10 = | 3.1487E+00 | 3.7873E+01 | −4.8558E+03 | −6.3086E+03 |
| A12 = | −4.0555E+00 | −2.3943E+02 | 1.5325E+04 | 2.8631E+04 |
| A14 = | 2.4307E+00 | 4.2620E+02 | — | −6.9957E+04 |
| A16 = | −5.6064E−01 | −2.6385E+02 | — | 7.0929E+04 |

| Surface # | | | | |
|---|---|---|---|---|
| | 7 | 8 | 9 | 10 |
| k = | 8.2356E+01 | −3.4450E+00 | −1.5788E+00 | −2.4954E+00 |
| A4 = | 2.0545E+00 | 7.1402E−01 | 5.3584E−01 | −1.2548E+00 |
| A6 = | −1.8325E+01 | −1.0896E+01 | −1.4394E+01 | 1.4633E+00 |
| A8 = | 1.0429E+02 | 5.0482E+01 | 5.8257E+01 | −4.3823E−01 |
| A10 = | −3.8410E+02 | −1.4386E+02 | −1.5572E+02 | −2.0148E+00 |

TABLE 14-continued

Aspheric Coefficients

| A12 = | 8.6915E+02 | 2.7076E+02 | 2.4786E+02 | 3.3742E+00 |
|---|---|---|---|---|
| A14 = | −1.0628E+03 | −3.1800E+02 | −1.8934E+02 | −2.1172E+00 |
| A16 = | 5.3561E+02 | 1.8530E+02 | 4.8153E+01 | 4.8148E−01 |

In the 7th embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.11 | (R1 − R2)/R1 + R2) | −0.32 |
| Fno | 2.04 | (R5 + R6)/(R5 − R6) | 1.09 |
| HFOV [deg.] | 62.7 | f3/f2 | 0.50 |
| Vmin | 20.40 | f/f1 | −0.19 |
| V1/N1 | 36.30 | f/f2 | 0.54 |
| V2/N2 | 36.26 | f/f4 | −0.86 |
| V3/N3 | 36.46 | |f/f1| + |f/f2| | 0.73 |
| V4/N4 | 12.29 | TL [mm] | 2.95 |
| V1 − V4 | 35.68 | TL/f | 2.66 |
| T12/CT1 | 1.35 | TL/ImgH | 2.14 |
| EPD/T12 | 1.40 | f/EPD | 2.04 |
| CT2/CT3 | 0.56 | SD/TD | 0.71 |
| (CT1 + CT4 + T23)/CT3 | 1.00 | Yc11/Yc42 | 0.33 |
| (CT1 + CT2 + CT4)/CT3 | 1.44 | ImgH/f | 1.24 |
| (CT3/R1) + (CT3/R2) | −0.71 | Yc42/f | 0.58 |

8th Embodiment

Figure 15:
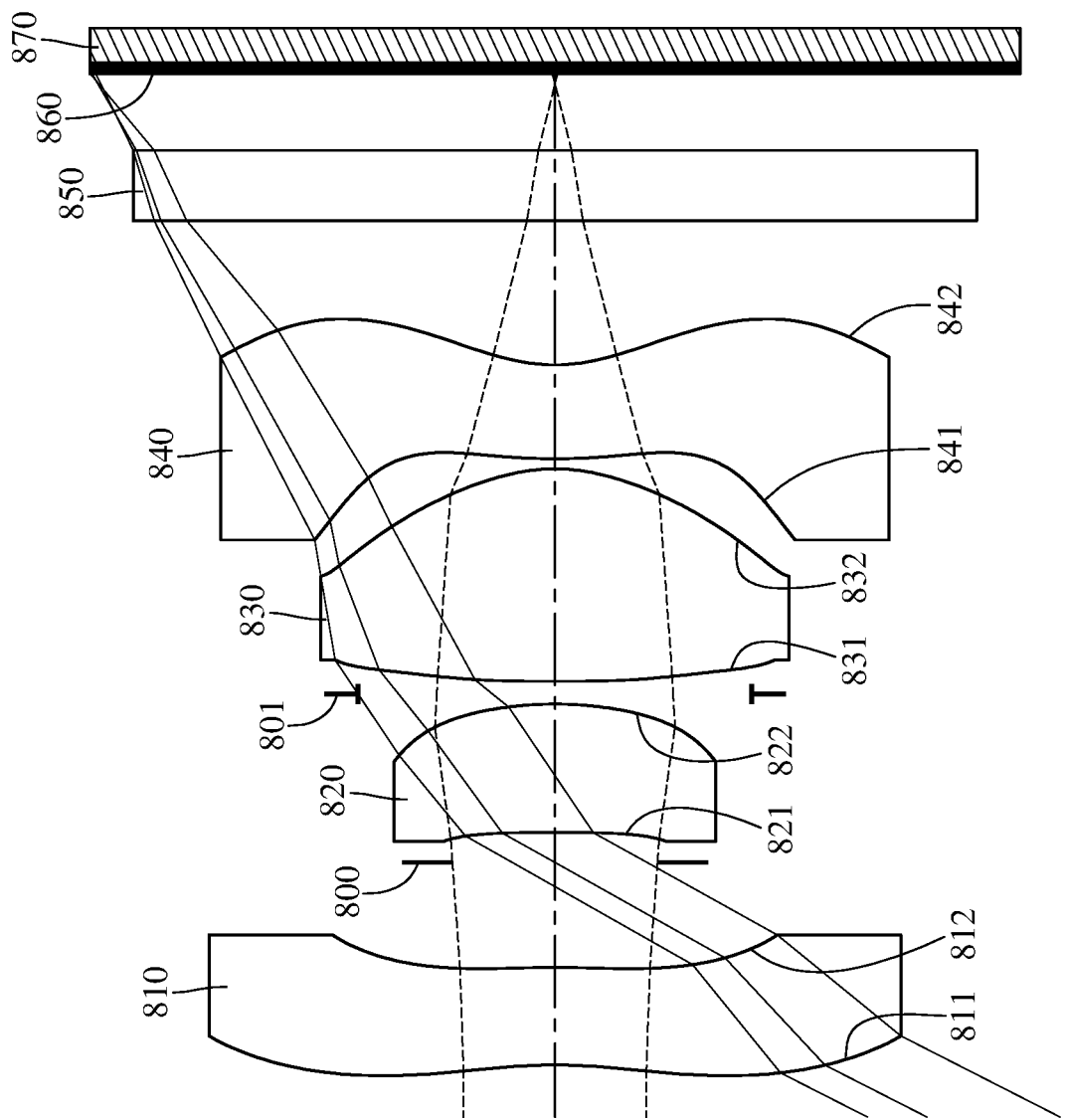
FIG. 15 is a schematic view of an image capturing unit according to the 8th embodiment of the present disclosure.
Figure 16:
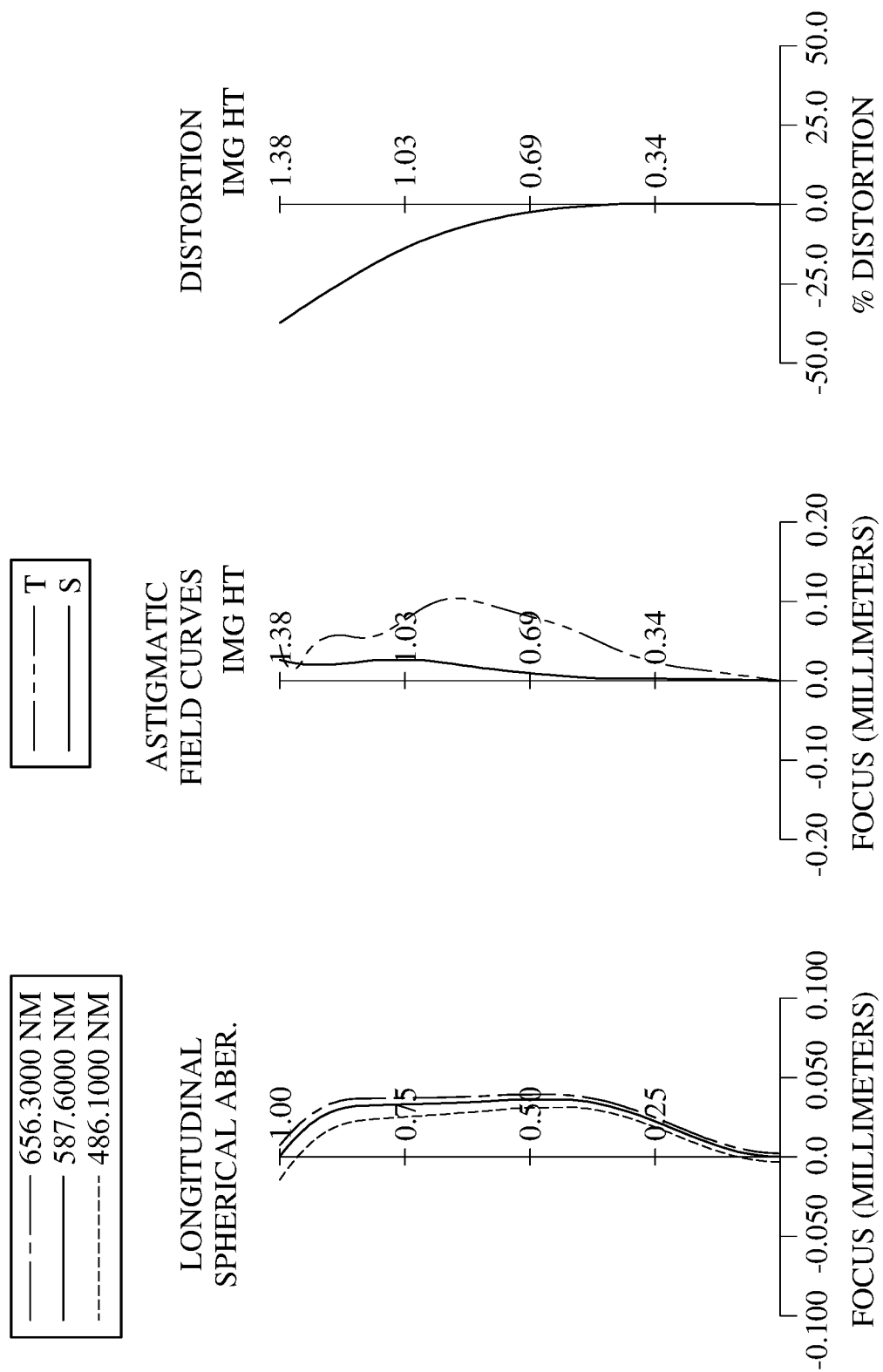
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging system (its reference numeral is omitted) of the present disclosure and an image sensor 870. The optical imaging system includes, in order from an object side to an image side, a first lens element 810, an aperture stop 800, a second lens element 820, a stop 801, a third lens element 830, a fourth lens element 840, a filter 850 and an image surface 860. The optical imaging system includes four lens elements (810, 820, 830 and 840) with no additional lens element disposed between each of the adjacent four lens elements.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has at least one convex shape in an off-axis region thereof. The object-side surface 811 of the first lens element 810 has one critical point in the off-axis region thereof.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one convex shape in an off-axis region thereof. The image-side surface 842 of the fourth lens element 840 has one critical point in the off-axis region thereof.

The filter 850 is made of glass material and located between the fourth lens element 840 and the image surface 860, and will not affect the focal length of the optical imaging system. The image sensor 870 is disposed on or near the image surface 860 of the optical imaging system.

The detailed optical data of the 8th embodiment are shown in Table 15 and the aspheric surface data are shown in Table 16 below.

TABLE 15

8th Embodiment
f = 1.11 mm, Fno = 2.04, HFOV = 63.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.418 | (ASP) | 0.291 | Plastic | 1.545 | 56.1 | −5.49 |
| 2 | | −2.891 | (ASP) | 0.313 | | | | |
| 3 | Ape. Stop | Plano | | 0.090 | | | | |
| 4 | Lens 2 | −7.421 | (ASP) | 0.383 | Plastic | 1.534 | 55.9 | 2.20 |
| 5 | | −1.032 | (ASP) | 0.030 | | | | |
| 6 | Stop | Plano | | 0.038 | | | | |
| 7 | Lens 3 | 56.733 | (ASP) | 0.634 | Plastic | 1.534 | 55.9 | 0.98 |
| 8 | | −0.525 | (ASP) | 0.030 | | | | |
| 9 | Lens 4 | 1.804 | (ASP) | 0.280 | Plastic | 1.660 | 20.4 | −1.18 |
| 10 | | 0.512 | (ASP) | 0.430 | | | | |
| 11 | Filter | Plano | | 0.210 | Glass | 1.517 | 64.2 | — |
| 12 | | Plano | | 0.229 | | | | |
| 13 | Image | Plano | | — | | | | |

Note:
Reference wavelength is 587.6 nm (d-line).
An effective radius of the stop 801 (Surface 6) is 0.587 mm.

TABLE 16

Aspheric Coefficients

| Surface # | | | | |
|---|---|---|---|---|
| | 1 | 2 | 4 | 5 |
| k = | −3.5442E+01 | −1.3222E+01 | 5.7105E+01 | −7.5277E−01 |
| A4 = | 4.5739E−01 | 2.2457E+00 | −1.2382E+00 | 1.7265E+00 |
| A6 = | −5.1516E−01 | −9.3603E+00 | 1.9293E+01 | −4.1582E+01 |
| A8 = | −2.6197E−02 | 2.4008E+01 | −6.1358E+02 | 4.3844E+02 |
| A10 = | 1.2979E+00 | −2.8996E+00 | 8.2032E+03 | −3.2631E+03 |
| A12 = | −1.9388E+00 | −1.3971E+02 | −5.9296E+04 | 1.4713E+04 |
| A14 = | 1.2073E+00 | 3.0632E+02 | 1.6889E+05 | −3.6721E+04 |
| A16 = | −2.7936E−01 | −2.0667E+02 | — | 3.8420E+04 |

| Surface # | | | | |
|---|---|---|---|---|
| | 7 | 8 | 9 | 10 |
| k = | 9.0000E+01 | −3.8207E+00 | −2.5227E+01 | −2.7518E+00 |
| A4 = | 2.2240E+00 | 7.3711E−01 | 5.9303E−01 | −1.4458E+00 |
| A6 = | −1.9767E+01 | −1.3319E+01 | −1.7387E+01 | 2.5002E+00 |
| A8 = | 1.1101E+02 | 8.0746E+01 | 7.7737E+01 | −2.9337E+00 |
| A10 = | −4.0551E+02 | −2.8887E+02 | −2.0447E+02 | 1.4427E+00 |
| A12 = | 8.8443E+02 | 6.3147E+02 | 2.8330E+02 | 5.4619E−01 |
| A14 = | −1.0120E+03 | −7.9607E+02 | −1.5220E+02 | −8.5798E−01 |
| A16 = | 4.6718E+02 | 4.5232E+02 | — | 2.5131E−01 |

In the 8th embodiment, the equation of the aspheric surface profiles of the aforementioned lens elements is the same as the equation of the 1st embodiment. Also, the definitions of these parameters shown in the following table are the same as those stated in the 1st and 2nd embodiments with corresponding values for the 8th embodiment, so an explanation in this regard will not be provided again.

Moreover, these parameters can be calculated from Table 15 and Table 16 as the following values and satisfy the following conditions:

8th Embodiment

| | | | |
|---|---|---|---|
| f [mm] | 1.11 | (R1 − R2)/R1 + R2) | −0.34 |
| Fno | 2.04 | (R5 + R6)/(R5 − R6) | 0.98 |
| HFOV [deg.] | 63.0 | f3/f2 | 0.44 |
| Vmin | 20.40 | f/f1 | −0.20 |
| V1/N1 | 36.30 | f/f2 | 0.51 |
| V2/N2 | 36.46 | f/f4 | −0.94 |
| V3/N3 | 36.46 | |f/f1| + |f/f2| | 0.71 |
| V4/N4 | 12.29 | TL [mm] | 2.96 |
| V1 − V4 | 35.68 | TL/f | 2.66 |
| T12/CT1 | 1.38 | TL/ImgH | 2.14 |
| EPD/T12 | 1.35 | f/EPD | 2.04 |
| CT2/CT3 | 0.60 | SD/TD | 0.71 |
| (CT1 + CT4 + T23)/CT3 | 1.01 | Yc11/Yc42 | 0.32 |
| (CT1 + CT2 + CT4)/CT3 | 1.50 | ImgH/f | 1.24 |
| (CT3/R1) + (CT3/R2) | −0.67 | Yc42/f | 0.57 |

9th Embodiment

Figure 17:
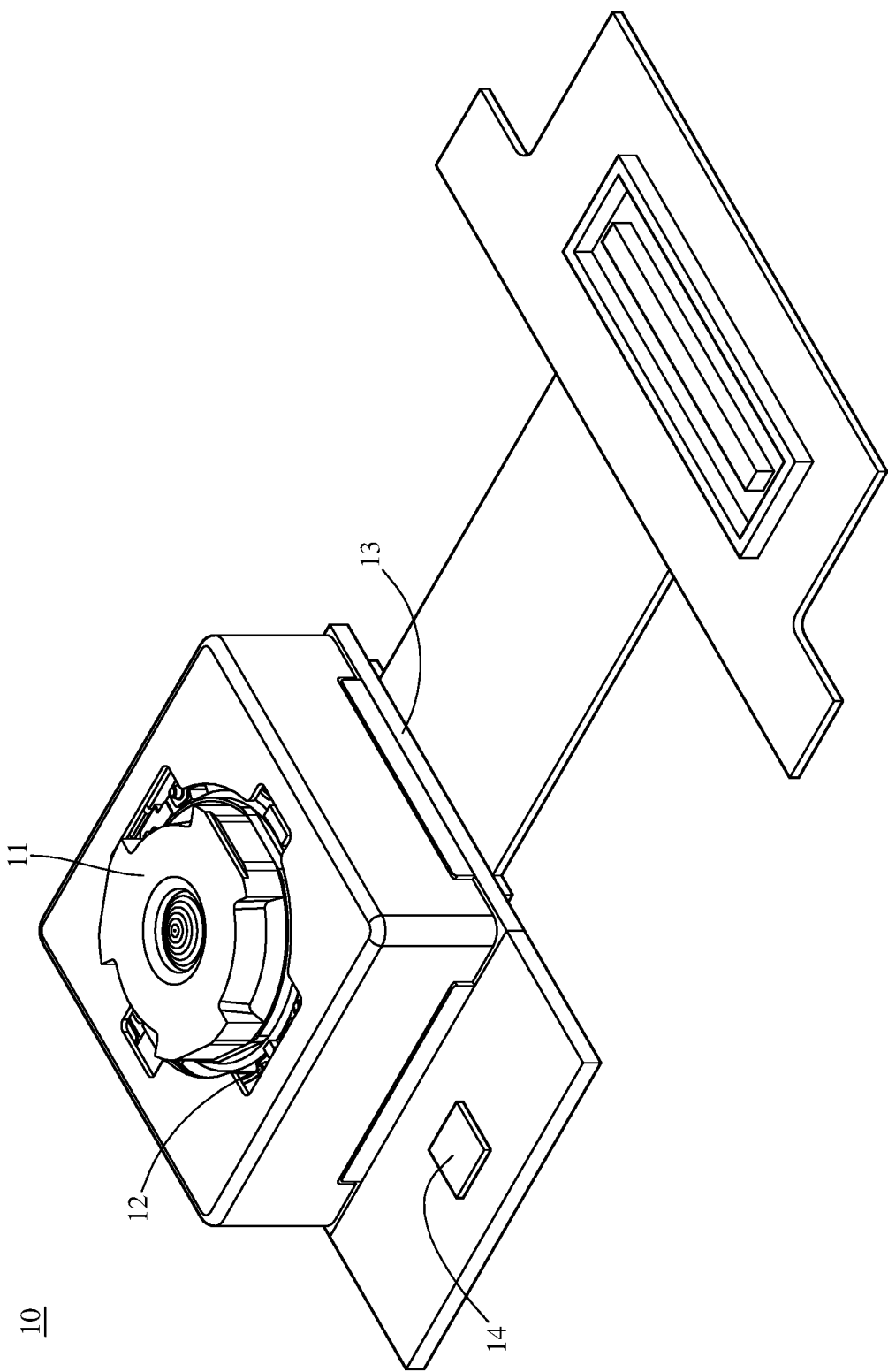
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the optical imaging system disclosed in the 1st embodiment, a barrel and a holder member (their reference numerals are omitted) for holding the optical imaging system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
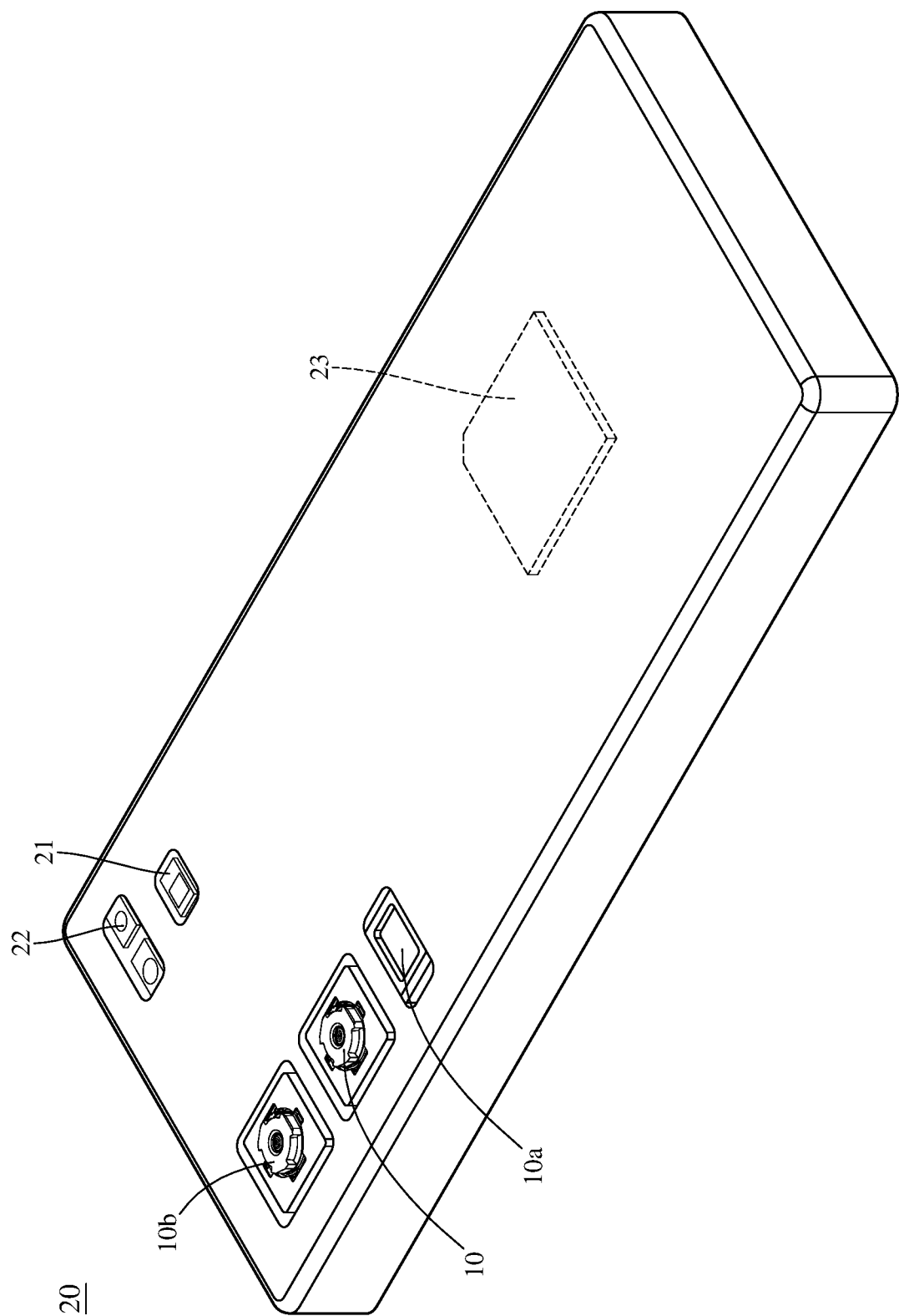
FIG. 18 is one perspective view of an electronic device according to the 10th embodiment of the present disclosure.
Figure 19:
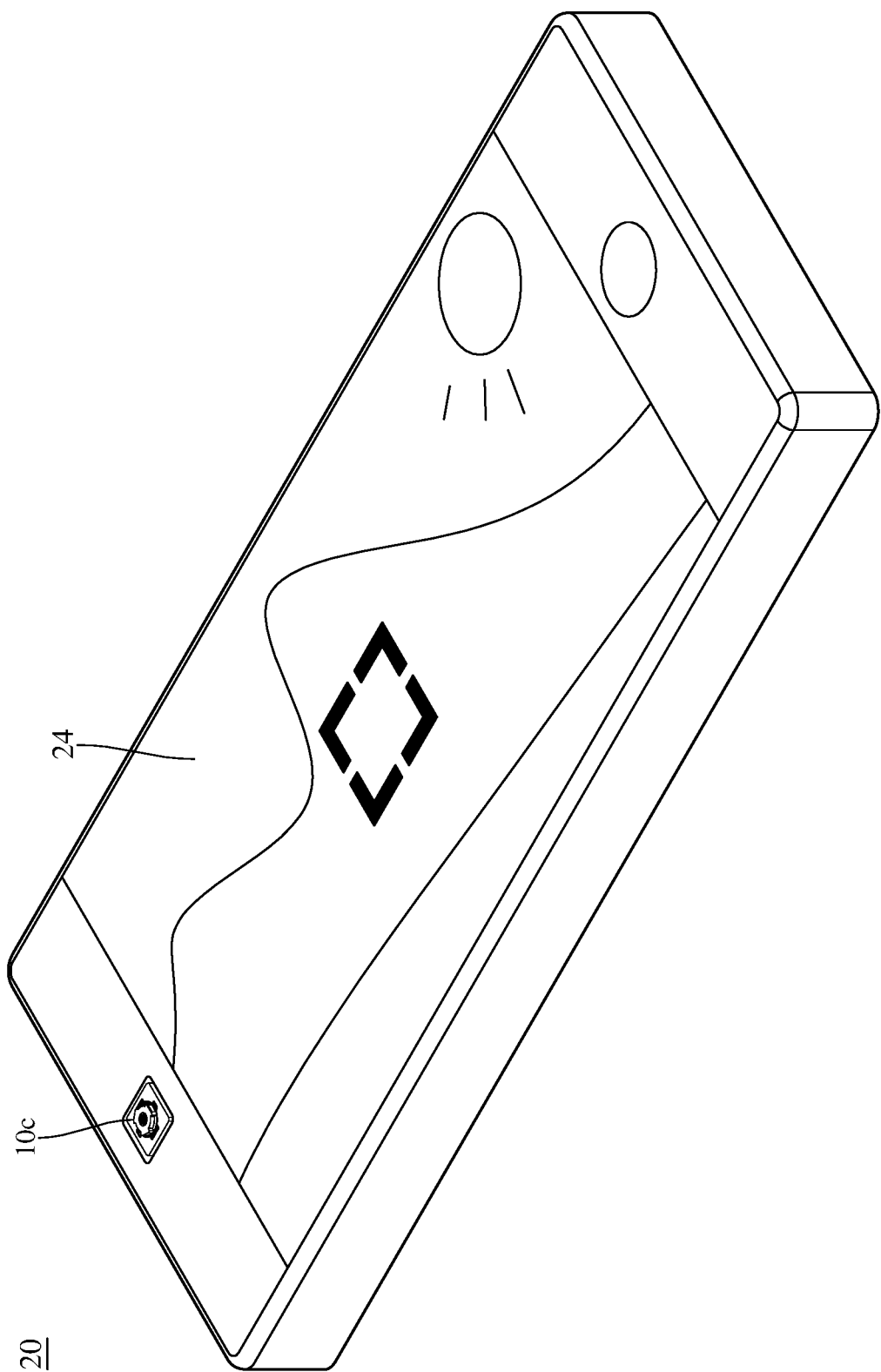
FIG. 19 is another perspective view of the electronic device in FIG. 18.
Figure 20:
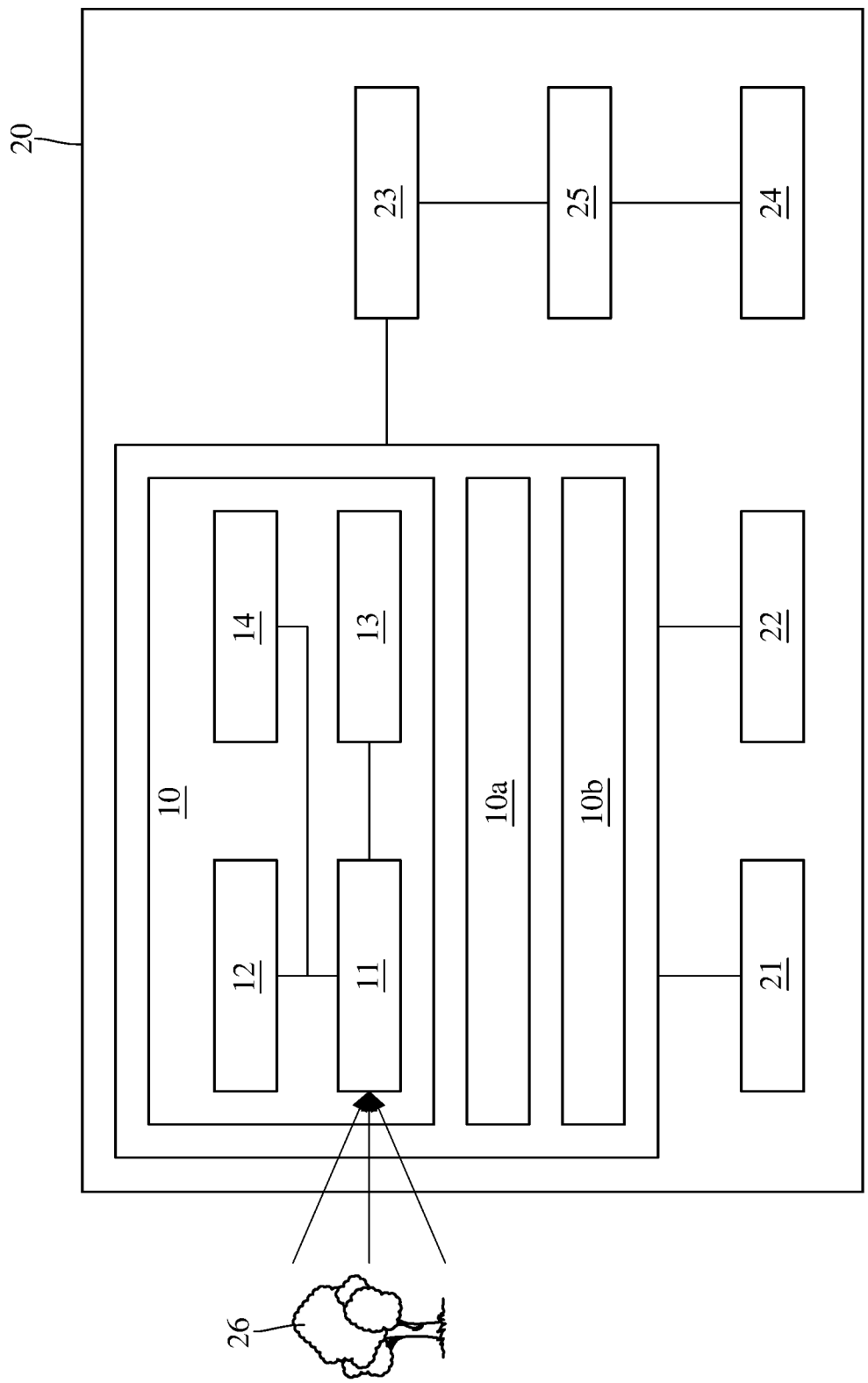
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 20 is a smartphone including the image capturing unit 10 disclosed in the 9th embodiment, an image capturing unit 10a, an image capturing unit 10b, an image capturing unit 10c, a flash module 21, a focus assist module 22, an image signal processor 23, a user interface 24 and an image software processor 25. The image capturing unit 10c is located on the same side as the user interface 24, and the image capturing unit 10, the image capturing unit 10a and the image capturing unit 10b are located on the opposite side. The image capturing unit 10, the image capturing unit 10a and the image capturing unit 10b all face the same direction, and each of the image capturing units 10, 10a and 10b has a single focal point. Furthermore, the image capturing unit 10a, the image capturing unit 10b and the image capturing unit 10c all have a configuration similar to that of the image capturing unit 10. In detail, each of the image capturing unit 10a, the image capturing unit 10b and the image capturing unit 10c includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10 is a wide-angle image capturing unit, the image capturing unit 10a is a telephoto image capturing unit and the image capturing unit 10b is a super wide-angle image capturing unit), such that the electronic device 20 has various magnification ratios so as to meet the requirement of optical zoom functionality. In this embodiment, the electronic device 20 includes multiple image capturing units 10, 10a, 10b and 10c, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the electronic device 20 can capture images of the object 26 via the image capturing unit 10c. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices. In addition, the optical imaging system of the present disclosure can also be applied to image recognition systems for biometrics, such as fingerprint, iris and face recognition.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising four lens elements, the four lens elements being, in order from an object side to an image side, a first lens element, a second lens element, a third lens element and a fourth lens element; each of the four lens elements having an object-side surface facing toward the object side and an image-side surface facing toward the image side;

wherein the object-side surface of the first lens element is concave in a paraxial region thereof, the image-side surface of the first lens element is convex in a paraxial region thereof, the object-side surface of the fourth lens element is convex in a paraxial region thereof, the image-side surface of the fourth lens element is concave in a paraxial region thereof, and the image-side surface of the fourth lens element has at least one convex shape in an off-axis region thereof;

wherein a focal length of the optical imaging system is f, a focal length of the first lens element is f1, a focal length of the second lens element is f2, an entrance pupil diameter of the optical imaging system is EPD, a central thickness of the first lens element is CT1, a central thickness of the second lens element is CT2, a central thickness of the third lens element is CT3, a central thickness of the fourth lens element is CT4, a curvature radius of the object-side surface of the first lens element is R1, a curvature radius of the image-side surface of the first lens element is R2, and the following conditions are satisfied:

$0 \leq |f/f1| + |f/f2| < 1.0$;

$1.0 < f/EPD < 2.70$;

$CT1 < CT3$;

$CT2 < CT3$;

$CT4 < CT3$; and $-0.55 < (R1-R2)/(R1+R2) < 0.17$.

2. The optical imaging system of claim 1, wherein the third lens element has positive refractive power, the image-side surface of the third lens element is convex in a paraxial region thereof, and the fourth lens element has negative refractive power.

3. The optical imaging system of claim 1, wherein the object-side surface of the second lens element is concave in a paraxial region thereof, and the image-side surface of the second lens element is convex in a paraxial region thereof.

4. The optical imaging system of claim 1, further comprising an aperture stop, wherein the aperture stop is disposed between the first lens element and the second lens element, an axial distance between the aperture stop and the image-side surface of the fourth lens element is SD, an axial distance between the object-side surface of the first lens element and the image-side surface of the fourth lens element is TD, the focal length of the optical imaging system is f, the entrance pupil diameter of the optical imaging system is EPD, and the following conditions are satisfied:

$0.45 < SD/TD < 0.95$; and $1.0 < f/EPD < 2.50$.

5. The optical imaging system of claim 1, wherein the central thickness of the second lens element is CT2, the central thickness of the third lens element is CT3, and the following condition is satisfied:

$0.20 < CT2/CT3 < 0.60$.

6. The optical imaging system of claim 1, wherein the central thickness of the third lens element is CT3, the curvature radius of the object-side surface of the first lens element is R1, the curvature radius of the image-side surface of the first lens element is R2, and the following condition is satisfied:

$-2.50 < (CT3/R1) + (CT3/R2) < -0.55$.

7. The optical imaging system of claim 1, wherein an axial distance between the object-side surface of the first lens element and an image surface is TL, the focal length of the optical imaging system is f, the entrance pupil diameter of the optical imaging system is EPD, and the following conditions are satisfied:

$1.0 \text{ [mm]} < TL < 3.30 \text{ [mm]}$; and $1.0 < f/EPD < 2.30$.

8. The optical imaging system of claim 1, wherein the central thickness of the first lens element is CT1, the central thickness of the third lens element is CT3, the central thickness of the fourth lens element is CT4, an axial distance between the second lens element and the third lens element is T23, and the following condition is satisfied:

$0.20 < (CT1 + CT4 + T23)/CT3 \leq 1.0$.

9. The optical imaging system of claim 1, wherein the focal length of the optical imaging system is f, the focal length of the first lens element is f1, the focal length of the second lens element is f2, and the following condition is satisfied:

$0 \leq |f/f1| + |f/f2| < 0.50$.

10. The optical imaging system of claim 5, wherein a maximum image height of the optical imaging system is ImgH, the focal length of the optical imaging system is f, and the following condition is satisfied:

$1.20 < ImgH/f < 3.0$.

11. The optical imaging system of claim 6, wherein a minimum value among Abbe numbers of all lens elements of the optical imaging system is Vmin, and the following condition is satisfied:

$13.0 < Vmin < 21.0$.

12. The optical imaging system of claim 7, wherein an axial distance between the first lens element and the second lens element is T12, an axial distance between the second lens element and the third lens element is T23, an axial distance between the third lens element and the fourth lens element is T34, and the following conditions are satisfied:

$T23 < T12$; and $T34 < T12$.

13. The optical imaging system of claim 8, wherein a vertical distance between a critical point on the object-side surface of the first lens element and an optical axis is Yc11, a vertical distance between a critical point on the image-side surface of the fourth lens element and the optical axis is Yc42, and the following condition is satisfied:

$0.15 < Yc11/Yc42 < 1.50$.

14. An image capturing unit, comprising:
the optical imaging system of claim 1; and
an image sensor disposed on an image surface of the optical imaging system.

15. An electronic device, comprising:
the image capturing unit of claim 14.

* * * * *